United States Patent
Shi et al.

(10) Patent No.: US 11,229,077 B2
(45) Date of Patent: Jan. 18, 2022

(54) DATA TRANSMISSION METHOD, ACCESS NETWORK DEVICE, AND TERMINAL

(71) Applicant: Huawei Technologies Co., Ltd., Shenzhen (CN)

(72) Inventors: Xiaoli Shi, Shanghai (CN); Jiubin Gan, Shanghai (CN); Kaijie Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 135 days.

(21) Appl. No.: 16/686,801

(22) Filed: Nov. 18, 2019

(65) Prior Publication Data

US 2020/0092928 A1 Mar. 19, 2020

Related U.S. Application Data

(63) Continuation of application No. PCT/CN2018/087243, filed on May 17, 2018.

(30) Foreign Application Priority Data

May 17, 2017 (CN) .......................... 201710349042.X

(51) Int. Cl.
*H04W 76/15* (2018.01)
*H04W 76/14* (2018.01)
(Continued)

(52) U.S. Cl.
CPC ........... *H04W 76/15* (2018.02); *H04W 76/14* (2018.02); *H04W 88/04* (2013.01); *H04W 92/10* (2013.01); *H04W 92/18* (2013.01); *H04W 92/20* (2013.01)

(58) Field of Classification Search
CPC ..... H04W 76/14; H04W 76/15; H04W 88/04; H04W 92/10; H04W 92/20
See application file for complete search history.

(56) References Cited

U.S. PATENT DOCUMENTS

2016/0044565 A1 2/2016 Lee et al.
2016/0135095 A1 5/2016 Wu
(Continued)

FOREIGN PATENT DOCUMENTS

CN 105122887 A 12/2015
CN 105491682 A 4/2016
(Continued)

*Primary Examiner* — Brian P Cox
(74) *Attorney, Agent, or Firm* — Leydig, Voit & Mayer, Ltd.

(57) ABSTRACT

This application provides a data transmission method, an access network device, and a terminal. The method includes: receiving, by a first terminal, first instruction information from a first access network device, where the first terminal accesses the first access network device, and the first instruction information is used to trigger the first terminal to connect to a second terminal; connecting, by the first terminal, to the second terminal based on the first instruction information; and performing, by the first terminal, data transmission with a second access network device by using the second terminal, where the second access network device is configured to transmit data between the first access network device and the first terminal. In this way, the first access network device and the second access network device can both provide a data transmission service for the first terminal, thereby improving communication quality of the first terminal.

15 Claims, 10 Drawing Sheets

(51) Int. Cl.
*H04W 88/04* (2009.01)
*H04W 92/10* (2009.01)
*H04W 92/18* (2009.01)
*H04W 92/20* (2009.01)

(56) References Cited

U.S. PATENT DOCUMENTS

| | | |
|---|---|---|
| 2016/0212682 A1 | 7/2016 | Chung et al. |
| 2016/0217452 A1 | 7/2016 | Wong et al. |
| 2016/0286471 A1 | 9/2016 | Zisimopoulos et al. |
| 2017/0086114 A1* | 3/2017 | Jung ............... H04B 17/327 |
| 2017/0086242 A1 | 3/2017 | Ahn et al. |
| 2018/0124676 A1* | 5/2018 | Zeng ................ H04W 36/30 |
| 2018/0184436 A1* | 6/2018 | Ohtsuji ............. H04B 7/2606 |
| 2018/0249516 A1 | 8/2018 | Jung et al. |
| 2019/0147747 A1* | 5/2019 | Arngren ........... G08G 5/0026 |
| | | 701/2 |

FOREIGN PATENT DOCUMENTS

| | | | | |
|---|---|---|---|---|
| CN | 105592549 A | 5/2016 | | |
| CN | 105981454 A | 9/2016 | | |
| CN | 106165510 A | 11/2016 | | |
| RU | 47118 U1 | 8/2005 | | |
| RU | 48656 U1 | 10/2005 | | |
| WO | 2016208097 A1 | 12/2016 | | |
| WO | WO-2016208097 A1 * | 12/2016 | ............... | H04B 7/14 |
| WO | 2017000888 A1 | 1/2017 | | |
| WO | WO-2017000888 A1 * | 1/2017 | ............ | H04W 48/16 |
| WO | 2017026808 A1 | 2/2017 | | |
| WO | 2017030400 A1 | 2/2017 | | |

* cited by examiner

DATA TRANSMISSION METHOD, ACCESS NETWORK DEVICE, AND TERMINAL

CROSS-REFERENCE TO RELATED APPLICATIONS

This application is a continuation of International Application No. PCT/CN2018/087243, filed on May 17, 2018, which claims priority to Chinese Patent Application No. 201710349042.X filed on May 17, 2017. The disclosures of the aforementioned applications are hereby incorporated by reference in their entireties.

TECHNICAL FIELD

This application relates to the wireless communications field, and in particular, to a data transmission method, an access network device, and a terminal.

BACKGROUND

In a process of communication between a terminal and a base station, if the terminal is in an area with relatively poor signal coverage of the base station, quality of an air interface of the base station and the terminal deteriorates. To ensure a cell throughput, the base station serving as a primary base station may add a data link between the terminal and a secondary base station for the terminal, and transfer a part or all data of the terminal to the secondary base station for transmission, that is, implement dual-connectivity (DC) for the terminal.

In the prior art, the secondary base station is determined by the primary base station based on information about measurement performed by the terminal on at least one base station. However, when a base station has poor signal coverage, for example, in a scenario in which a terminal is excessively distant from the base station, the terminal cannot feed back measurement information to the primary base station. Alternatively, even if the terminal obtains the base station through measurement, there is no proper secondary base station to perform data offloading for the terminal when interference of the base station is relatively large.

SUMMARY

Embodiments of this application provide a data transmission method, an access network device, and a terminal.

According to a first aspect, an embodiment of this application provides a data transmission method, including: receiving, by a first terminal, first instruction information from a first access network device, where the first terminal accesses the first access network device, and the first instruction information is used to trigger the first terminal to connect to a second terminal; connecting, by the first terminal, to the second terminal based on the first instruction information; and performing, by the first terminal, data transmission with a second access network device by using the second terminal, where the second access network device is configured to transmit data between the first access network device and the first terminal.

The first access network device serves as a master node, and the second access network device serves as a secondary node, to jointly provide a data transmission service for the first terminal.

In the data transmission method provided in this embodiment of this application, the first terminal connects to the second terminal, and the first terminal performs data transmission with the second access network device by using the second terminal, so that the second access network device can serve as the secondary node, to offload the data between the first access network device and the first terminal, and improve communication quality of the first terminal.

In a possible implementation of the first aspect, the method further includes: receiving, by the first terminal, identification information of the first access network device from the first access network device; and sending, by the first terminal, the identification information to the second terminal, so that the second terminal sends the identification information to the second access network device, where the identification information is used by the second access network device to request the first access network device to establish a communication link between the second access network device and the first terminal. In this implementation, the second access network device actively requests to serve as the secondary node from the first access network device, and the first access network device further establishes a dual-connectivity link to the second access network device instead of selecting a secondary node based on measurement information of the first terminal.

In a possible implementation of the first aspect, the method further includes: receiving, by the first terminal, first identification information of the first access network device and second identification information of a neighboring access network device of the first access network device from the first access network device; and sending, by the first terminal, the first identification information and the second identification information to the second terminal, so that the second terminal sends second instruction information to the neighboring access network device, where the second instruction information is used to instruct the neighboring access network device to determine whether to request the first access network device to establish a communication link between the neighboring access network device and the first terminal. In this implementation, the secondary node (the second access network device) is a neighboring access network device of the first access network device, thereby avoiding the following case in which the dual-connectivity link cannot be successfully established because there is no communications interface between the first access network device and the second access network device, and improving a data offloading effect of the secondary node.

In a possible implementation of the first aspect, the method further includes: receiving, by the first terminal, identification information of at least one access network device from the second terminal, where the at least one access network device includes the second access network device; and sending, by the first terminal, the identification information of the at least one access network device to the first access network device, so that the first access network device requests to add the second access network device to transmit the data between the first access network device and the first terminal.

Optionally, the second terminal determines the identification information that is of at least one access network device and that is sent to the first terminal. The at least one access network device may include an access network device to which a current serving cell of the second terminal belongs, or may include an access network device obtained by the second terminal through measurement.

In a possible implementation of the first aspect, the method further includes: receiving, by the first terminal, identification information of a neighboring access network device of the first access network device from the first access network device; sending, by the first terminal, the identification information of the neighboring access network device to the second terminal, so that the second terminal determines the second access network device from the neighboring access network device; receiving, by the first terminal, identification information of the second access network device from the second terminal; and sending, by the first terminal, the identification information of the second access network device to the first access network device, so that the first access network device requests to add the second access network device to transmit the data between the first access network device and the first terminal. In this implementation, the secondary node (the second access network device) is a neighboring access network device of the first access network device, thereby avoiding the following case in which the dual-connectivity link cannot be successfully established because there is no communications interface between the first access network device and the second access network device, and improving a data offloading effect of the secondary node.

According to a second aspect, an embodiment of this application provides a data transmission method, including: sending, by a first access network device, first instruction information to a first terminal, where the first terminal accesses the first access network device, and the first instruction information is used to trigger the first terminal to connect to a second terminal, so that the first terminal performs data transmission with a second access network device by using the second terminal, where the second access network device is configured to transmit data between the first access network device and the first terminal.

In a possible implementation of the second aspect, the method further includes: sending, by the first access network device, identification information of the first access network device to the first terminal, so that the second access network device receives the identification information from the first terminal by using the second terminal, where the identification information is used by the second access network device to request the first access network device to establish a communication link between the second access network device and the first terminal.

In a possible implementation of the second aspect, the method further includes: sending, by the first access network device, first identification information of the first access network device and second identification information of a neighboring access network device of the first access network device to the first terminal, so that the neighboring access network device receives second instruction information from the first terminal by using the second terminal, where the second instruction information is used to instruct the neighboring access network device to determine whether to request the first access network device to establish a communication link between the neighboring access network device and the first terminal.

In a possible implementation of the second aspect, the method further includes: receiving, by the first access network device, identification information of at least one access network device from the first terminal, where the at least one access network device includes the second access network device; determining, by the first access network device, the second access network device from the at least one access network device; and requesting, by the first access network device, to add the second access network device to transmit the data between the first access network device and the first terminal.

In a possible implementation of the second aspect, the method further includes: sending, by the first access network device, identification information of a neighboring access network device of the first access network device to the first terminal, so that the second terminal receives the identification information of the neighboring access network device from the first terminal and determines the second access network device from the neighboring access network device; receiving, by the first access network device, identification information of the second access network device from the second terminal by using the first terminal; and requesting, by the first access network device, to add the second access network device to transmit the data between the first access network device and the first terminal.

According to a third aspect, an embodiment of this application provides a data transmission method, including: connecting, by a second terminal, to a first terminal, where the first terminal accesses a first access network device; and determining, by the second terminal, a second access network device, where the second access network device is configured to transmit data between the first access network device and the first terminal.

In a possible implementation of the third aspect, the method further includes: receiving, by the second terminal, identification information of the first access network device from the first terminal; and sending, by the second terminal, the identification information to the second access network device, where the identification information is used by the second access network device to request the first access network device to establish a communication link between the second access network device and the first terminal.

In a possible implementation of the third aspect, the method further includes: receiving, by the second terminal, first identification information of the first access network device and second identification information of a neighboring access network device of the first access network device from the first terminal; and sending, by the second terminal, instruction information to the neighboring access network device, where the instruction information is used to instruct the neighboring access network device to determine whether to request the first access network device to establish a communication link between the neighboring access network device and the first terminal.

In a possible implementation of the third aspect, the method further includes: sending, by the second terminal, identification information of at least one access network device to the first terminal, where the at least one access network device includes the second access network device, so that the first access network device receives the identification information of the at least one access network device from the first terminal and requests to add the second access network device to transmit the data between the first access network device and the first terminal.

In a possible implementation of the third aspect, the method further includes: receiving, by the second terminal, identification information of a neighboring access network device of the first access network device from the first terminal, where the determining, by the second terminal, a second access network device includes: determining, by the second terminal, the second access network device from the neighboring access network device; and sending, by the second terminal, identification information of the second access network device to the first terminal, so that the first access network device receives the identification information of the second access network device from the first terminal and requests to add the second access network device to transmit the data between the first access network device and the first terminal.

According to a fourth aspect, an embodiment of this application provides a data transmission method, including: receiving, by a second access network device, identification information of a first access network device from a first terminal by using a second terminal, where the first terminal accesses the first access network device, and the first terminal connects to the second terminal; and requesting, by the second access network device, the first access network device to establish a communication link between the second access network device and the first terminal, where the communication link is used to transmit data between the first access network device and the first terminal.

In the data transmission method provided in any one of the foregoing aspects, the first terminal may be a drone terminal, the second terminal may be a ground terminal, and a device-to-device (D2D) link is established between the first terminal and the second terminal. Correspondingly, in the data transmission method provided in any one of the foregoing aspects, the first access network device may be a base station having a capability of communicating with the drone terminal, for example, may be a drone-dedicated base station; and the second access network device may be any type of base station.

According to a fifth aspect, an embodiment of this application provides an apparatus. The apparatus has a function of implementing behavior of the first access network device in any one of the foregoing data transmission methods or a function of implementing behavior of the second access network device in any one of the foregoing data transmission methods. The function may be implemented by using hardware, or may be implemented by executing corresponding software by hardware. The hardware or software includes one or more units or means corresponding to the function.

According to a sixth aspect, an embodiment of this application provides an access network device, including a processor and a transceiver. The processor is configured to support the access network device in performing a corresponding function of the first access network device or the second access network device in the foregoing data transmission method. The transceiver is configured to: support communication between the access network device and a terminal, and send information or an instruction in the foregoing data transmission method to the terminal. The access network device may further include a memory. The memory is configured to be coupled to the processor, and store a program instruction and data that are necessary for the access network device. The access network device may further include a communications interface. The communications interface is configured to communicate with another network device.

In a possible implementation, the access network device is a base station.

According to a seventh aspect, an embodiment of this application provides an apparatus. The apparatus has a function of implementing behavior of the first terminal in any one of the foregoing data transmission methods or a function of implementing behavior of the second terminal in any one of the foregoing data transmission methods. The function may be implemented by using hardware, or may be implemented by executing corresponding software by hardware. The hardware or software includes one or more units or means (means) corresponding to the function.

According to an eighth aspect, an embodiment of this application provides a terminal. A structure of the terminal includes a processor and a transceiver. The processor is configured to support the terminal in performing a corresponding function of the first terminal or the second terminal in the foregoing data transmission method. The transceiver is configured to: support communication between an access network device and the terminal, and send information or an instruction in the foregoing data transmission method to the access network device. The terminal may further include a memory. The memory is configured to be coupled to the processor, and store a program instruction and data that are necessary for the terminal.

According to a ninth aspect, an embodiment of the present invention provides a communications system, including the first access network device and the second access network device in the foregoing aspects. The communications system may further include the terminal in the foregoing aspects.

According to a tenth aspect, an embodiment of this application provides a computer-readable storage medium. The computer-readable storage medium stores an instruction. When the instruction is run on a computer, the computer is enabled to perform the data transmission method in the foregoing aspects.

According to an eleventh aspect, an embodiment of this application provides a computer program product including an instruction. When the computer program product is run on a computer, the computer is enabled to perform the data transmission method in the foregoing aspects.

According to a twelfth aspect, an embodiment of this application provides a chip. The chip may perform the data transmission method in any one of the foregoing aspects.

In the technical solutions provided in the embodiments of this application, the first terminal connects to the second terminal, and performs data transmission with the second access network device by using the second terminal. In this way, the first terminal separately connects to the first access network device and the second access network device. The first access network device serves as the master node, and the second access network device may serve as the secondary node, to offload the data between the first access network device and the first terminal, thereby improving communication quality of the first terminal. When the first terminal is a drone terminal in a fight state, the drone terminal establishes a D2D link to the ground terminal, to perform dual connectivity communication with a ground base station, thereby meeting a data communication requirement of the drone terminal.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

FIG. 3-1 is a schematic flowchart of a data transmission method according to an embodiment of this application;

FIG. 3-2 is a schematic flowchart of a data transmission method according to an embodiment of this application;

DESCRIPTION OF EMBODIMENTS

Figure 1:
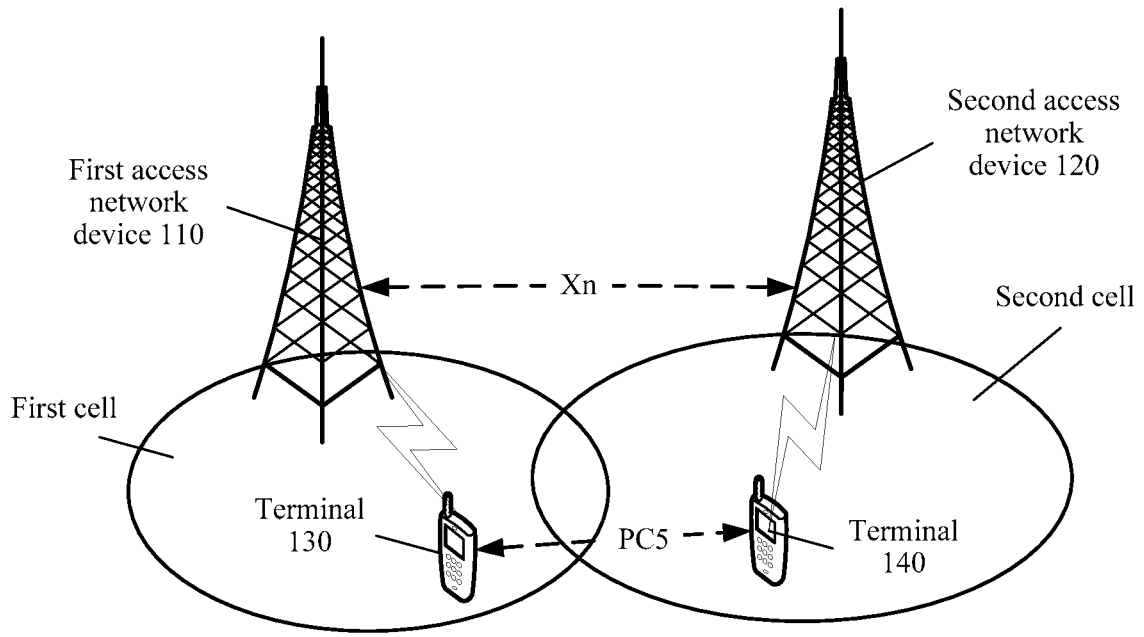
FIG. 1 is a schematic diagram of a communications system according to an embodiment of this application.

A technology described in the embodiments of this application may be applied to various communications systems, for example, a 4G (fourth generation) system such as an LTE system, a 5G (fifth generation) system such as a new radio access network (New RAN, NR) or an evolved LTE (eLTE) system, or another next-generation communications system.

An access network device described in the embodiments of this application includes an access network side device in the NR, for example, a gNB, a transmission point (TRP), or a base station device including a centralized unit ( ) and a distributed unit (DU). The CU may also be referred to as a control unit. When a base station device in the Long Term Evolution (, LTE) system, namely, an evolved NodeB (eNB) connects to a 5G core network (5G CN), the LTE eNB may also be referred to as an eLTE eNB. Specifically, the eLTE eNB is an evolved LTE base station device based on the LTE eNB, and may directly connect to the 5G CN. The eLTE eNB also belongs to a base station device in the NR. The access network device may alternatively be a device evolved NodeB (eNB) in the LTE system. The access network device may alternatively be an access point (access point, AP), or another network device having a capability of communicating with a terminal and a core network. A type of the access network device is not limited in the embodiments of this application.

The terminal used in the embodiments of this application may include a handheld device, a vehicle-mounted device, a wearable device, a computing device, and an aerospace device that have a wireless communication function, or another processing device connected to a wireless modem, various forms of user equipments (UEs), mobile stations (MS), and terminal devices (terminal equipment), and the like. The aerospace device may be a drone or another flying device with a communications module. The drone may also be referred to as drone user equipment (drone UE), or an unmanned aerial vehicle (UAV).

As defined in the embodiments of this application, a one-way communication link from an access network to a terminal is a downlink link, data transmitted on the downlink link is downlink data, and a transmission direction of the downlink data is referred to as a downlink direction; a one-way communication link from the terminal to the access network is an uplink, data transmitted on the uplink is uplink data, and a transmission direction of the uplink data is referred to as an uplink direction.

Resources described in the embodiments of this application are transmission resources, including a time domain resource and a frequency domain resource; and may be used to carry data or signaling in an uplink communication process or a downlink communication process.

D2D described in the embodiments of this application is a technology that can be used to implement direct communication between terminals at a short distance. Based on D2D, a terminal may access a wireless network by using another terminal and maintain a connection to the wireless network. Specifically, a D2D link may be established between two terminals by using a technology such as Bluetooth or Wi-Fi.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification indicates an "or" relationship between the associated objects.

It should be understood that in the embodiments of the present invention, "B corresponding to A" indicates that B is associated with A, and B may be determined based on A. However, it should further be understood that determining B based on A does not mean that B is determined based only on A, and B may also be determined based on A and/or other information.

In the embodiments of this application, "a plurality of" refers to two or more than two.

Descriptions such as "first" and "second" in the embodiments of this application are merely used for indicating and distinguishing between described objects, do not show a sequence, do not indicate a specific limitation on a quantity of devices in the embodiments of this application, and do not constitute any limitation on the embodiments of this application.

In the embodiments of this application, a "connection" means various connection manners such as a direct connection or an indirect connection, to implement communication between devices. This is not limited in the embodiments of this application.

In the embodiments of this application, a "network" and a "system" express a same concept, and a communications system is a communications network.

FIG. 1 is a schematic diagram of a communications system according to an embodiment of this application.

The communications system shown in FIG. 1 includes a first access network device 110 and a second access network device 120. A cell managed by the first access network device 110 is referred to as a first cell. A cell managed by the second access network device 120 is referred to as a second cell. As shown in FIG. 1, an overlapping area may exist between the first cell and the second cell. Alternatively, the second cell may be located within a range of the first cell, which is not shown in FIG. 1. A first terminal 130 accesses the first access network device 110, and a second terminal 140 accesses the second access network device 120.

The first terminal performs D2D communication with the second terminal. Specifically, the second terminal 140 serves as a relay terminal of the first terminal 130, and enables the first terminal 130 to access the second access network device 120. There is a communications interface between the first terminal 130 and the second terminal 140, for example, a PC5 interface shown in FIG. 1. There is a communications interface between the second terminal 140 and the second access network device 120, for example, a Uu interface shown in FIG. 1. There may also be a communications interface between the first access network device 110 and the second access network device 120, for example, an Xn interface (which may also be referred to as an X2 interface) shown in FIG. 1.

The first terminal 130 establishes a control plane (CP) on the first access network device 110, and performs user plane (UP) data transmission with the first access network device 110. Because a location of the first terminal 130 varies as the first terminal 130 moves, if the first terminal moves from a near end of the first access network device 110 to a far end of the first access network device 110, for example, as shown in FIG. 1, the first terminal moves from the first cell to the second cell, the first terminal 130 gradually moves away from a signal coverage area of the first access network device 110, and quality of an air interface between the first terminal 130 and the first access network device 110 deteriorates. To ensure a cell throughput, the first terminal 130 may access the second access network device 120 by using the second terminal 140 while maintaining communication with the first access network device 110, so that the first terminal 130 implements dual connectivity with the first access network device 110 and the second access network device 120. The first access network device 110 serves as a master node (MN), and the second access network device 120 serves as a secondary node (SN), to transfer a part or all data of the first terminal 130 from the first access network device to the second access network device for transmission. It may be understood that, when both the first access network device 110 and the second access network device 120 are base station devices, the master node may be referred to as a primary base station, and the secondary node may be referred to as a secondary base station.

Specifically, dual connectivity is implemented in different manners, or there are different offloading manners for terminal data. For example, the secondary node may establish only a user plane connection separately to a terminal and a core network. In this case, in a downlink direction, downlink data delivered by the core network may be offloaded at a packet data convergence protocol (PDCP) layer of the master node to the secondary node, and the secondary node sends the downlink data to the terminal. In an uplink direction, the secondary node receives uplink data from the terminal, then the secondary node sends the received uplink data to the master node, and the master node collects the uplink data and then sends the collected uplink data to the core network. Such a dual connectivity manner may be referred to as a split bearer (or referred to as a 3C type). Alternatively, the secondary node establishes a user plane connection and a data plane connection to a core network, and the secondary node establishes only a data plane connection to a terminal. In this case, in a downlink direction, the secondary node may directly receive downlink data from the core network and send the downlink data to the terminal. In an uplink direction, the secondary node may directly send uplink data received from the terminal to the core network. Such a dual connectivity manner may be referred to as a secondary cell group bearer (SCG bearer) (or referred to as a TA type). It may be understood that, in any dual connectivity manner, the master node and the core network have a control plane connection and a user plane connection, and the master node and the terminal have a control plane connection and a user plane connection. In short, the 3C type means that the terminal data is offloaded at the primary base station, and the TA type means that the terminal data is offloaded in the core network.

The secondary node may be configured to transmit data related to some or all services of the terminal, for example, data of some services is transmitted by using the master node and data of remaining services is transmitted by using the secondary node. This is not limited in this embodiment of this application.

It may be understood that, one terminal may access a master node and a plurality of secondary nodes at the same time, and each secondary node may separately transmit a part of user plane data of the terminal. The dual connectivity may also be referred to as multi-connectivity.

In a drone terminal communication scenario, the first terminal is a drone terminal in a flight state, the second terminal is a ground terminal, the first access network device is a base station having a capability of communicating with the drone terminal, for example, a dedicated base station or a common base station for managing the drone terminal, and the second access network device is any type of base station, for example, a common base station. The dedicated base station has a complete communication capability for the drone terminal in a near-end range, and a low-rate data and signaling communication capability for the drone terminal in a far-end range. The near-end range and the far-end range may be obtained through division depending on whether signal quality in corresponding space can enable communication quality of UE to reach a specific threshold. For example, space with a geographic radius of 20 kilometers and an error radius of 3 kilometers may be considered as a far-end range. In addition, the dedicated base station may also have a function of a common ground base station. The common base station has a function of a common ground base station and a complete communication capability for the drone terminal in the near-end range. The common base station may further serve as a data plane relay node of a high-altitude drone terminal.

If a flying height of the drone terminal is relatively high, the drone terminal cannot directly measure a base station located on the ground, or when base stations may be relatively distant from each other, and the drone terminal cannot obtain a proper base station through measurement, the drone terminal cannot feed back measurement information to the primary base station, and consequently, the dedicated base station cannot select a proper secondary base station for the drone terminal. Alternatively, if the drone terminal is in a strong interference area of a plurality of base stations, even if the drone terminal can obtain the base station through measurement, the base station obtained through measurement cannot be directly used as the secondary base station to offload data of the drone terminal due to the relatively strong interference.

Figure 2:
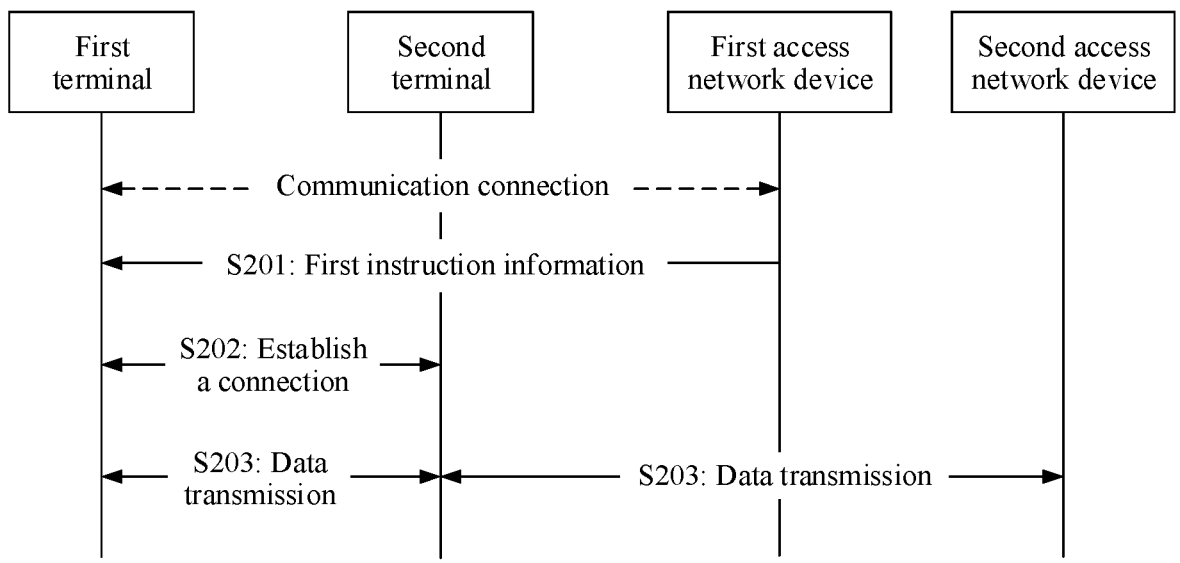
FIG. 2 is a schematic flowchart of a data transmission method according to an embodiment of this application.

FIG. 2 is a schematic flowchart of a data transmission method according to an embodiment of this application. The method may be applied to the communications system shown in FIG. 1.

The method includes the following steps.

S201: A first access network device sends first instruction information to a first terminal, where the first terminal accesses the first access network device, and the first instruction information is used to trigger the first terminal to connect to a second terminal.

That the first terminal accesses the first access network device includes: The first terminal establishes a communication connection to the first access network device, and the first terminal may perform data transmission with the first access network device.

That the first instruction information is used to trigger the first terminal to connect to a second terminal includes: The first instruction information may be configured to instruct the first terminal to perform a discovery process, and the first terminal determines the second terminal as a relay terminal through the discovery process.

Optionally, the first access network device may further send a dual connectivity data transmission request to the first terminal. Specifically, the first access network device determines, based on a condition such as a current load status, a bandwidth, or a cell throughput, whether to perform dual connectivity for the first terminal, and sends the dual connectivity data transmission request to the first terminal, so that the first terminal sends the request to a second base station by using the second terminal. In this case, the second base station may perform a dual connectivity establishment process with a first base station based on the request.

Optionally, the first access network device may send the first instruction information to the first terminal by using any message sent by the access network device to the terminal. For example, a radio resource control (RRC) connection reconfiguration message includes the first instruction information, or a dedicated message may be set for the first instruction information. This is not limited in this embodiment of this application.

S202: The first terminal connects to the second terminal based on the first instruction information.

Specifically, the discovery process may be performed by using any implementation in the prior art, so that the first terminal connects to the second terminal. This is not limited in this embodiment of this application. For example, the first terminal may directly initiate the discovery process. To be specific, a discovery manner in a mode B (mode B) is used, and the first terminal sends a request message to at least one terminal in a measurement range, that is, a candidate relay terminal. If a terminal accepts the request of the first terminal, the terminal sends a response message to the first terminal, to complete the discovery process. After the discovery process is performed, the first terminal may establish a communication link to the second terminal.

Optionally, if the discovery fails, in other words, the first terminal does not discover a proper relay terminal, the first terminal may notify the first access network device that the discovery fails. For example, the first terminal may notify, by using an RRC complete message, the first base station that the discovery fails, or notify the first base station by using another newly-added dedicated message or an existing message. This is not limited in this embodiment of this application.

S203: The first terminal performs data transmission with a second access network device by using the second terminal, where the second access network device is configured to transmit data between the first access network device and the first terminal.

Specifically, the second access network device may serve as a secondary node, to offload the data between the first access network device and the first terminal. For example, the first terminal may send uplink data to the second access network device by using the second terminal; and the second access network device transmits the uplink data to a core network, or the second access network device sends the uplink data to the first access network device and then the first access network device transmits the uplink data to the core network. Alternatively, the first access network device may offload, to the second access network device, a part or all of downlink data delivered by the core network; or the second access network device directly receives downlink data from the core network and then the second access network device sends the downlink data to the first terminal by using the second terminal. It may be understood that, there may be one or more second access network devices, and the first access network device serving as a master node may connect to one or more secondary nodes.

Optionally, in an implementation of this application, the method further includes: sending, by the first access network device, identification information of the first access network device to the first terminal. In this case, the first terminal may send the identification information of the first access network device to the second terminal, so that the second terminal can send the identification information of the first access network device to the second access network device, and the second access network device requests the first access network device to establish a communication link between the second access network device and the first terminal.

The communication link may also be referred to as a data communication link. The communication link includes three nodes: the first terminal, the second terminal, and the second access network device. The second access network device may perform data transmission with the first terminal through the communication link. The link between the first terminal and the second terminal is a D2D link.

Optionally, the identification information of the first access network device and the first instruction information may be included in a same message/different messages that is/are sent by the first access network device to the first terminal. This is not limited in this embodiment of this application.

Optionally, the first terminal sends the identification information of the first access network device to the second terminal by using a discovery message, and the second terminal sends the discovery message to the second access network device. The discovery message is a general term of messages exchanged between the first terminal and the second terminal in the discovery process. For example, the first terminal may add the identification information of the first access network device to a solicitation (solicitation) message that is sent to the second terminal.

The identification information of the first access network device may be a cell identity such as a physical cell identifier (PCI), or other identification information that is of the access network device and that can be identified by the second access network device. This is not limited in this embodiment of this application.

Optionally, in an implementation of this application, the method further includes: receiving, by the first terminal, identification information of the first access network device and identification information of a neighboring access network device of the first access network device from the first access network device. In this case, the first terminal may send the identification information of the first access network device and the identification information of the neighboring access network device to the second terminal. Further, the second terminal may send second instruction information to the corresponding neighboring access network device, where the second instruction information is used to instruct the neighboring access network device to determine whether to request the first access network device to establish a communication link between the neighboring access network device and the first terminal.

Specifically, the first access network device may determine at least one candidate secondary node. The candidate secondary node may be an access network device that has a communications interface with the first access network device. The first access network device sends secondary node information to the first terminal. The secondary node information may be identification information of a group of access network devices. For example, the candidate secondary node is a neighboring access network device of the first access network device. The first access network device obtains a neighboring cell list based on a neighboring relationship, and sends identification information of an access network device corresponding to the neighboring cell list to the first terminal.

Further, the discovery message sent by the first terminal to the second terminal includes not only the identification information of the first access network device but also the identification information of the neighboring access network device. After receiving the discovery message, the second terminal sends instruction information to each neighboring access network device. After receiving the instruction information, the neighboring access network device independently determines whether to establish a dual-connectivity link to the first access network device. If the neighboring access network device determines to perform dual connectivity, the neighboring access network device sends a request message to the first access network device, to request to establish a communication link between the neighboring access network device and the first terminal. If the first access network device receives request messages of a plurality of neighboring access network devices, the first access network device may determine, based on a condition such as signal quality, to use one or more of the neighboring access network devices as one or more secondary nodes. The instruction information sent by the second terminal to the neighboring access network device, namely, the second instruction information, may be the identification information of the first access network device. In other words, the identification information of the first access network device is used to trigger the neighboring access network device to determine whether to perform dual connectivity with the first access network device. Alternatively, the second instruction information may include the identification information of the first access network device and an explicit instruction. The explicit instruction triggers the neighboring access network device to determine whether to perform dual connectivity with the first access network device. Specific content of the second instruction information is not limited in this embodiment of this application.

Optionally, in another implementation, the second terminal selects a candidate secondary node from the at least one candidate secondary node determined by the first access network device, and sends the identification information of the first access network device to the secondary node. For example, the second terminal receives identification information of at least one neighboring access network device of the first access network device from the first terminal, and selects an access network device with strongest signal strength from the at least one neighboring access network device as a candidate secondary node, to send the identification information of the first access network device to the candidate secondary node. The candidate secondary node determines whether to establish a dual-connectivity link to the first access network device.

Optionally, in an implementation of this application, the method further includes: receiving, by the first terminal, identification information of at least one access network device from the second terminal; and then, sending, by the first terminal, the identification information of the at least one access network device to the first access network device, so that the first access network device can determine the second access network device from the at least one access network device, and request to add the second access network device to transmit the data between the first access network device and the first terminal.

That the first access network device requests to add the second access network device includes: The first access network device sends a secondary node addition request message to the second access network device.

Specifically, after the first terminal performs the discovery process, and determines the second terminal as the relay terminal, the second terminal may add, to the discovery message sent to the first terminal, identification information of at least one candidate secondary node determined by the second terminal. Further, the first terminal sends the identification information of the candidate secondary node to the first access network device, and the first access network device determines the second access network device from the candidate secondary node as a secondary node.

Optionally, if the second terminal is in an idle mode, the candidate secondary node determined by the second terminal may be an access network device that can be obtained by the second terminal through measurement or one or more access network devices whose signal quality exceeds a specific threshold in access network devices obtained by the second terminal through measurement. If the second terminal is in a connected mode, the candidate secondary node determined by the second terminal is an access network device to which a primary serving cell of the second terminal belongs.

Optionally, in an implementation of this application, the method further includes: receiving, by the first terminal, identification information of a neighboring access network device of the first access network device from the first access network device; further, sending, by the first terminal, the identification information of the neighboring access network device to the second terminal, so that the second terminal determines the second access network device from the neighboring access network device; further, receiving, by the first terminal, identification information of the second access network device from the second terminal, and sending the identification information of the second access network device to the first access network device, so that the first access network device can request to add the second access network device to transmit the data between the first access network device and the first terminal.

Specifically, after the first terminal performs the discovery process, and determines the second terminal as the relay terminal, the first terminal adds, to the discovery message, instruction information of a candidate secondary node determined by the first access network device. The instruction information may be identification information of a group of access network devices, for example, is identification information of an access network device corresponding to a neighboring cell list of the first access network device. This is not limited. The second terminal may select a candidate secondary node from the candidate secondary nodes. Optionally, the second terminal may perform selection based on current measurement information or other access network device-related information. For example, the second terminal may determine whether an access network device (which is briefly referred to as a "serving access network device" below) to which a current primary serving cell of the second terminal belongs falls within a range of the candidate secondary node; and if the access network device falls within the range of the candidate secondary node, the second terminal determines the serving access network device as a secondary node, and the second terminal sends a response message to the first terminal, where the response message includes identification information of the serving access network device. If the serving access network device of the second terminal falls outside the range of the candidate secondary node, the second terminal sends, to the first terminal, information indicating that there is no proper secondary node.

In the data transmission method provided in this embodiment of this application, the first terminal receives the first instruction information from the first access network device, where the first terminal accesses the first access network device, and the first instruction information is used to trigger the first terminal to connect to the second terminal; the first terminal connects to the second terminal based on the first instruction information; the first terminal performs data transmission with the second access network device by using the second terminal, where the second access network device is configured to transmit the data between the first access network device and the first terminal, the first access network device serves as a master node, and the second access network device serves a secondary node, to jointly provide a data transmission service for the first terminal, thereby improving communication quality of the first terminal.

In the following embodiments shown in FIG. 3-1, FIG. 3-2, and FIG. 4, the data transmission method provided in the embodiments of this application is further explained and described by using a drone communication scenario as an example. It is assumed that the first terminal is a drone terminal (which is briefly referred to as a "terminal 1" below), the second terminal is a ground terminal (which is briefly referred to as a "terminal 2" below), the first access network device is a drone dedicated base station (which is briefly referred to as a "base station 1" below), and the second access network device is a common base station (which is briefly referred to as a "base station 2" below). The drone terminal has accessed the drone dedicated base station.

It may be understood that, in the embodiments of this application, the first access network device may be alternatively a common base station having a capability of communicating with a drone and is not limited to being a drone dedicated base station; and the second access network device may be alternatively a drone dedicated base station and is not limited to being a common base station. The following descriptions are merely examples, and do not constitute any limitation on this application.

Figures 1, 3:
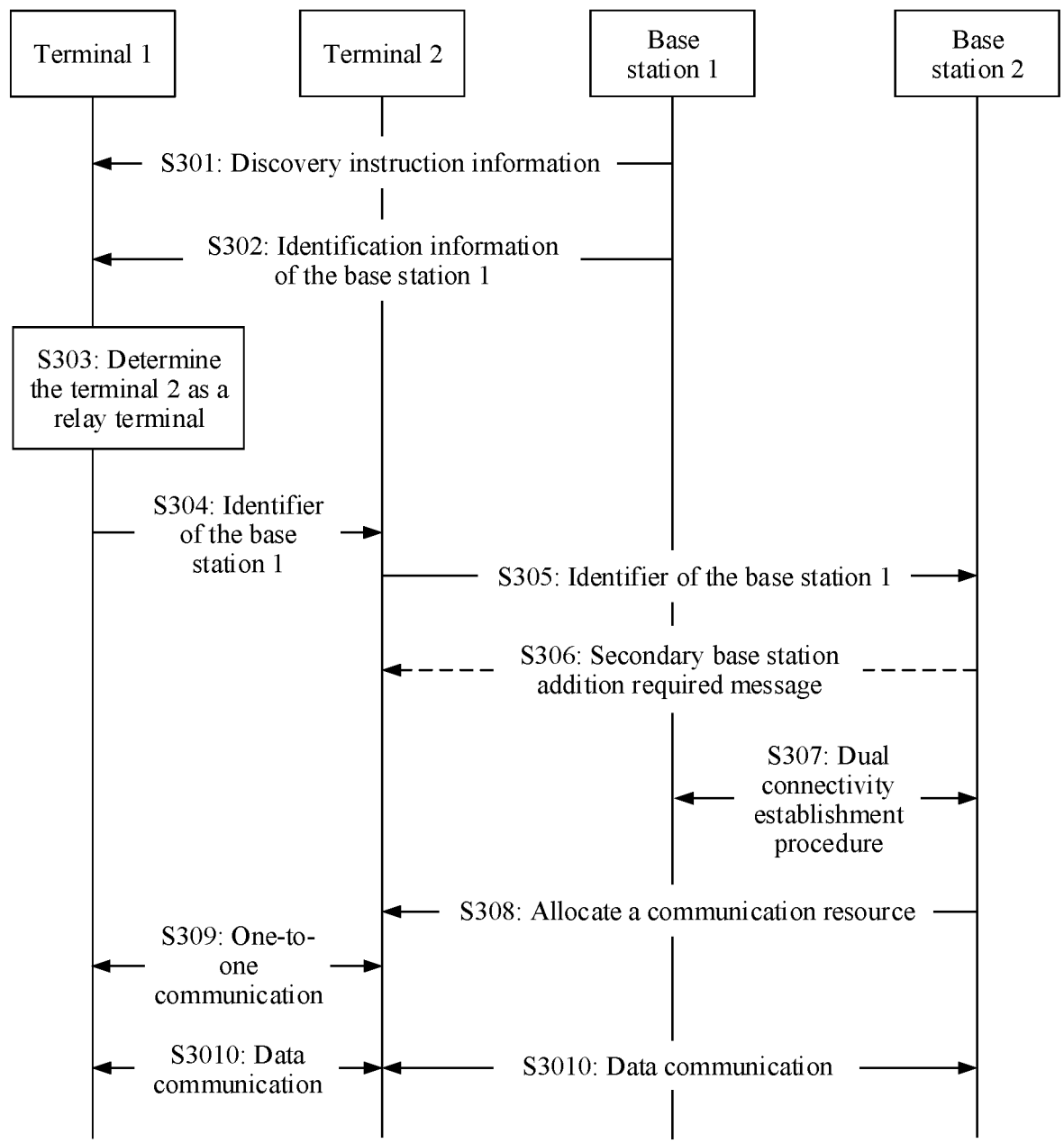
Figures 2, 3:
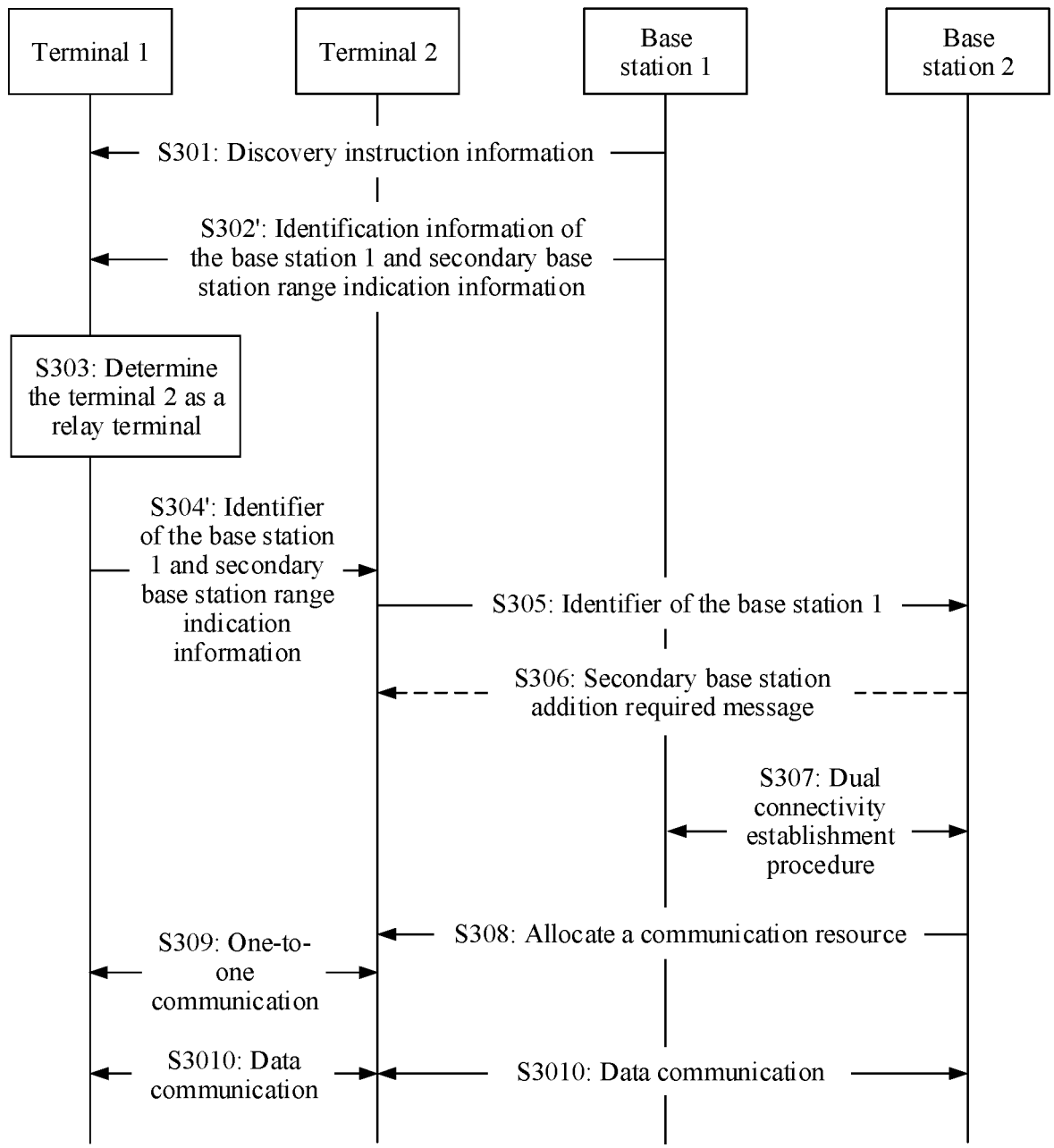

FIG. 3-1 is a schematic signaling flowchart of a data transmission method according to an embodiment of this application.

The method includes the following steps.

S301: The base station 1 sends discovery instruction information to the terminal 1.

The discovery instruction information is used to instruct the terminal 1 to discover a ground terminal that may serve as a relay terminal.

S302: The base station 1 sends identification information of the base station 1 to the terminal 1.

It may be understood that, there is no execution sequence of S301 and S302; and S301 may be performed before S302, or S302 may be performed before S301; or S301 and S302 may be performed at the same time. For example, the discovery instruction information and the identification information of the base station 1 are added to a same message. This is not limited in this embodiment of this application.

Optionally, the base station 1 further sends a dual connectivity data transmission request to the terminal 1. For a detailed description, refer to related content in the embodiment shown in FIG. 2. Details are not described again.

S303: The terminal 1 determines the terminal 2 as a relay terminal.

Specifically, after receiving the discovery instruction information, the terminal 1 performs a discovery process on the terminal 2, and determines that the terminal 2 is proper to be used as a relay terminal. For a detailed description of the discovery process, refer to related content in the embodiment shown in FIG. 2. Details are not described again.

S304: The terminal 1 sends the identification information of the base station 1 to the terminal 2.

Optionally, the identification information of the base station 1 is included in a discovery message sent by the terminal 1 to the terminal 2. The discovery message is, for example, a solicitation message.

S305: The terminal 2 sends the identification information of the base station 1 to the base station 2.

The base station 2 may be a base station to which a serving cell of the terminal 2 belongs, or may be a base station that is proper to access after the determining is performed by the terminal 2 after measurement, for example, a base station with strongest signal strength. This is not limited in this application. It may be understood that, a plurality of base stations may exist in a measurement range of the terminal 2. In this case, the terminal 2 may measure each base station, select a base station with best signal quality as a candidate secondary base station, and send the identification information of the base station 1 to the candidate secondary base station.

Optionally, the identification information of the base station 1 may be included in an RRC message sent by the terminal 2 to the base station 2, for example, an RRC connection reconfiguration complete message, or may be transmitted by using another message. Specifically, if the terminal 2 has not accessed the base station 2, the terminal 2 first needs to establish an RRC connection to the base station 2, and then the terminal 2 sends the identification information of the base station 1 to the base station 2 by using the RRC message. If the terminal 2 has established an RRC connection to the base station, the terminal 2 may transmit the identification information of the base station 1 by using a newly-added dedicated message or another existing message. This is not limited in this embodiment of this application.

Optionally, the terminal 2 may further send a dual connectivity establishment trigger instruction to the base station 2. For example, if the terminal 1 receives a dual connectivity data transmission request of the base station 1, the terminal 1 may send the request to the terminal 2, and then the terminal 2 sends the request to the base station 2; or the terminal 2 generates a dual connectivity establishment instruction based on the request and sends the instruction to the base station 2. A specific form of the dual connectivity establishment trigger instruction is not limited in this embodiment of this application.

S306: The base station 2 requests the base station 1 to establish a communication link between the base station 2 and the terminal.

Specifically, the base station 2 may identify the base station 1 by using the identification information of the base station 1, and further send a request message to the base station 1, for example, a secondary base station addition required (secondary eNB/secondary gNB addition required, SeNB/SgNB addition required) message, to request to be a secondary base station from the base station 1. In this way, the communication link between the base station 2 and the terminal is established. The SeNB indicates a secondary base station in an LTE system, and the SgNB indicates a secondary base station in NR. This is used as an example herein for description.

S307: The base station 1 and the base station 2 perform a dual connectivity establishment procedure.

After receiving the request message of the base station 2, the base station 1 determines whether the base station 2 is proper to be used as a secondary base station. If the base station 1 determines that the base station 2 may be used as the secondary base station, the base station 1 initiates the dual connectivity establishment procedure to the base station 2. The dual connectivity establishment procedure includes: The base station 1 sends a secondary base station addition request (SeNB/SgNB addition request) message to the base station 2, to request to establish a dual-connectivity link to the base station 2. If the base station 2 receives the dual connectivity establishment request, the base station 2 sends a secondary base station addition acknowledge (SeNB/SgNB addition acknowledge, SeNB addition ACK) message or a secondary base station addition response (SeNB/SgNB addition response) message to the base station 1. Subsequently, the base station 2 sends configuration information to the terminal 1. The dual-connectivity link is established between the base station 1 and the base station 2. For a detailed description of the dual connectivity establishment procedure, refer to related content in the prior art. Details are not described herein.

The configuration information may include any one or more pieces of the following information: bearer information, including identification information of a bearer that needs to be established, such as a radio access bearer identity (E-UTRAN radio access bearer identity, eRAB ID) or a data radio bearer (DRB) identifier; a tunnel endpoint identifier (TEID); quality of service (QoS) information, including a parameter such as QoS class identifier (QCI) or an allocation and retention priority (ARP); and an offloading type indication, for example, used to indicate whether an offloading type is a split bearer or an SCG bearer. For an NR system, the configuration information may further include information such as a flow identifier (flow ID) or a session identifier (session ID).

S308: The base station 2 allocates a communication resource to the terminal 2.

Optionally, the terminal 2 requests the base station 2 to allocate a communication resource, or the base station 2 actively initiates resource allocation to the terminal 2.

Specifically, if a terminal intends to perform D2D communication with another terminal, the terminal needs to send instruction information to a base station accessed by the terminal, to notify the base station that the terminal needs to perform D2D communication. Then the base station determines to use a specific resource allocation mode (for example, a mode 1 or a mode 2), and notifies the mode to the terminal by using signaling. If the terminal is instructed to use a resource allocation manner in the mode 1, the base station allocates a dedicated resource pool to the terminal by using dedicated signaling. If the terminal is instructed to use a resource allocation manner in the mode 2, the terminal directly uses an already stored resource pool to transmit data.

S309: The terminal 1 and the terminal 2 perform one-to-one communication.

Specifically, after obtaining the communication resource allocated by the base station 2, the terminal 2 may perform D2D communication, or referred to as one-to-one communication, with the terminal 1. Details are not described.

S3010: The terminal 1 performs data transmission with the base station 2 by using the terminal 2.

Specifically, because the terminal 1 establishes a communication link separately to the base station 1 and the base station 2, the base station 1 serves as a primary base station, and the base station 2 serves as a secondary base station, to perform dual connectivity communication with the terminal 1. The data transmission between the terminal 1 and the base station 2 is performed by using the terminal 2. For example, uplink data sent by the terminal 1 is transmitted to the base station 2 by using the terminal 2; or downlink data of the terminal 1 is sent by the base station 2 to the terminal 2, and then the terminal 2 transmits the downlink data of the terminal 1 to the terminal 1. Details are not described.

Optionally, as shown in FIG. 3-2, in an implementation of this application, S302 may be replaced with S302', and S302' includes: The base station 1 may send the identification information of the base station 1 and secondary base station range indication information to the terminal 1.

The secondary base station range indication information may be specifically a group of base station identifiers. Specifically, if no communications interface can be established between the common base station and the dedicated base station, for example, when the dedicated base station is excessively distant from the common base station, a dedicated base station may indicate a secondary base station range to the drone terminal, to enable successful establishment of dual connectivity. A base station indicated by the secondary base station range may be a base station corresponding to a neighboring relationship list obtained by the dedicated base station by using a neighboring relationship, that is, a neighboring base station of the dedicated base station. Subsequently, the dedicated base station sends the secondary base station range indication information to the drone terminal.

Correspondingly, S304 may be replaced with S304', and S304' includes: The terminal 1 sends the identification information of the base station 1 and the secondary base station range indication information to the terminal 2.

In this case, in S305, the terminal 2 sends the identification information of the base station 1 to base stations including the base station 2 that are indicated by the secondary base station range indication information.

Specifically, the drone terminal performs a discovery process, determines a ground terminal that serves as a relay terminal, and sends a discovery message carrying the secondary base station range indication information to the ground terminal. After receiving the discovery message, the ground terminal sends identification information of the dedicated base station to each candidate secondary base station, and the candidate secondary base station determines whether to perform dual connectivity. If the candidate secondary base station determines to perform dual connectivity, the candidate secondary base station requests the dedicated base station to establish a communication link between the candidate secondary base station and the drone terminal, that is, performs S306. The candidate secondary base station is the base station 2. It may be understood that, when a plurality of candidate secondary base stations separately request the dedicated base station to establish a communication link to the drone terminal, the primary base station may select one or more of the secondary base stations to initiate a dual connectivity establishment procedure.

In this implementation, the secondary base station is in the secondary base station range indicated by the base station 1, for example, is a neighboring base station of the base station 1, so that a reliable communication link can be established between the base station 1 and a finally determined secondary base station, thereby improving communication quality of the secondary base station.

Alternatively, in another implementation, the terminal 2 may choose, based on signal strength of a base station indicated by the secondary base station range indication information, to send the identification information of the base station 1 to a base station with strongest signal strength. In other words, the terminal 2 independently selects a base station that is most proper to be used as a secondary base station, and sends the identification information of the base station 1 to the base station.

In the data transmission method provided in this embodiment of this application, the drone terminal performs data transmission with the common base station by using the ground terminal, so that dual connectivity of the drone terminal to the dedicated base station and the common base station is implemented, thereby improving communication quality of the drone terminal.

Figure 4:
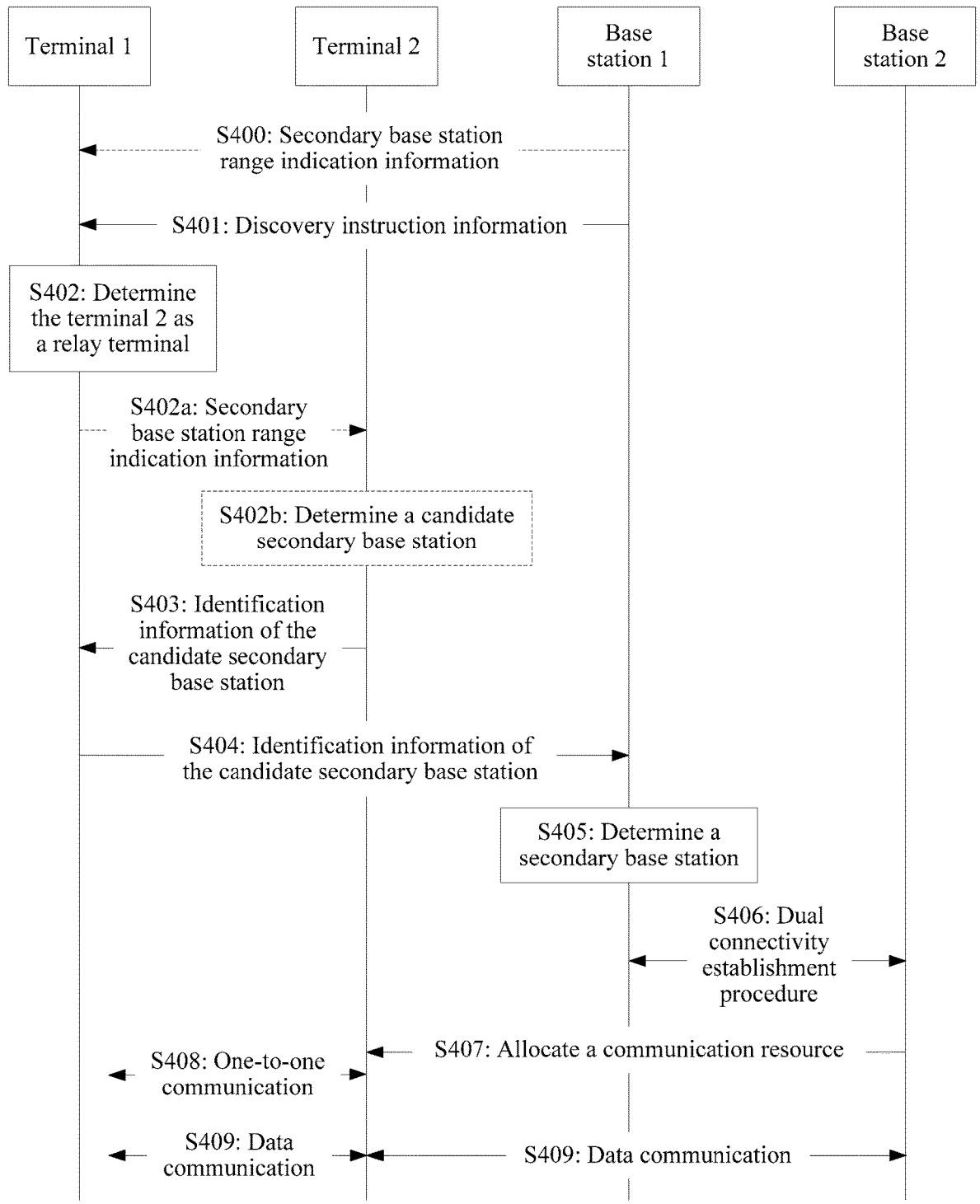
FIG. 4 is a schematic flowchart of a data transmission method according to an embodiment of this application.

FIG. 4 is a schematic signaling flowchart of a data transmission method according to an embodiment of this application.

The method includes the following steps.

S401: The base station 1 sends discovery instruction information to the terminal 1.

Optionally, the base station 1 may send, to the terminal, an RRC connection reconfiguration message that includes the discovery instruction information.

S402: The terminal 1 determines the terminal 2 as a relay terminal.

For a detailed description of how to determine a relay terminal, refer to step S303 in the embodiment of FIG. 3. Details are not described herein again.

S403: The terminal 2 sends identification information of a candidate secondary base station to the terminal 1.

Specifically, after the terminal 2 is determined as the relay terminal of the terminal 1, the terminal 2 may send, to the terminal 1, identification information of one or more candidate secondary base stations determined by the terminal 2. When the terminal 2 is in an idle mode, the candidate secondary base station includes a base station that can be obtained by the terminal 2 through measurement or one or more base stations whose signal quality exceeds a specific threshold that are obtained by the terminal 2 through measurement. When the terminal 2 is in a connected mode, the candidate secondary base station is a serving base station of the terminal 2.

Optionally, if the terminal 1 uses a discovery manner in a mode B, the terminal 1 sends, to the terminal 2, a discovery message including information requesting to add a secondary base station. For example, the terminal 1 instructs, by using a solicitation message, the terminal 2 to search for the candidate secondary base station. Further, the terminal 2 feeds back identification information of the candidate secondary base station to the terminal 1. For example, the terminal 2 sends the identification information of the secondary base station to the terminal 1 by using a response message of the solicitation message. Alternatively, there is no indication message in the discovery message sent by the terminal 1 to the terminal 2. After receiving the discovery message, the terminal 2 actively sends the identification information of the candidate secondary base station to the terminal 1. In other words, the discovery message triggers the terminal 2 to send the identification information of the candidate secondary base station to the terminal 1.

Optionally, if the discovery fails, the terminal 1 notifies the base station 1, for example, notifies the base station 1 by using an RRC complete message or another message. This is not limited in this embodiment of this application.

S404: The terminal 1 sends the identification information of the candidate secondary base station to the base station 1.

Optionally, the identification information of the candidate secondary base station is included in the RRC connection reconfiguration complete message sent by the terminal 1 to the base station 1.

S405: The base station 1 determines a secondary base station (the base station 2) from the candidate secondary base station.

Specifically, if the request received by the base station 1 includes identifiers of a plurality of candidate secondary base stations, the base station 1 needs to determine to select a base station as the secondary base station. Specifically, the base station 1 may determine the secondary base station based on a condition such as signal quality. Details are not described.

S406: The base station 1 and the base station 2 perform a dual connectivity establishment procedure.

S407: The base station 2 allocates a communication resource to the terminal 2.

S408: The terminal 1 and the terminal 2 perform one-to-one communication.

S409: The terminal 1 performs data transmission with the base station 2 by using the terminal 2.

For detailed descriptions of S406-S409, refer to steps S307 to S3010 in the embodiment shown in FIG. 3. Details are not described herein again.

Optionally, in an implementation of this application, the method further includes the following steps.

S400: The base station 1 sends secondary base station range indication information to the terminal 1.

The secondary base station range indication information may include identification information of a neighboring base station of the base station 1. For a detailed description, refer to related content in another embodiment of this application. Details are not described again.

It may be understood that, there is no execution sequence of S400 and S401; and S400 may be performed before S401, or S401 may be performed before S400, or S400 and S401 may be performed at the same time. For example, the discovery instruction information and the secondary base station range indication information are added to a same message. This is not limited in this embodiment of this application.

Correspondingly, after S402, the method further includes S402a: The terminal 1 sends the secondary base station range indication information to the terminal 2.

S402b: The terminal 2 determines a candidate secondary base station based on the secondary base station range indication information.

Specifically, when the terminal 1 discovers the relay terminal, the terminal 1 adds the secondary base station range indication information to the discovery message. After receiving the discovery message, the relay terminal determines the candidate secondary base station. Optionally, whether a current serving base station of the relay terminal is a base station indicated by the secondary base station range indication information is determined. Optionally, if the terminal 2 already has a serving base station, the terminal 2 determines whether the serving base station is a base station indicated by the secondary base station range indication information; and if the serving base station is the base station indicated by the secondary base station range indication information, the terminal 2 returns a discovery response message to the terminal 1. The response message includes identification information of the serving base station. In other words, the serving base station of the terminal 2 may serve as a secondary base station. Optionally, if the terminal 2 currently does not access any base station, the terminal 2 selects a base station (for example, selects a base station to which a cell with best signal quality belongs) based on measurement information, and determines whether the selected base station is a base station indicated by the secondary base station range indication information; and if the selected base station is a base station indicated by the secondary base station range indication information, the terminal 2 returns a discovery response message to the terminal 1. The response message includes identification information of the selected base station. If the serving base station of the terminal 2 or the base station selected by the terminal 2 falls outside a base station range indicated by the secondary base station range indication information, the terminal 2 notifies the terminal 1 that there is no proper secondary base station.

In this implementation, the secondary base station is in the base station range indicated by the base station 1, for example, is a neighboring base station of the base station 1, so that a reliable communication link can be established between the base station 1 and a finally determined secondary base station, thereby improving communication quality of the secondary base station.

In the data transmission method provided in this embodiment of this application, the drone terminal performs data transmission with the common base station by using the ground terminal, so that dual connectivity of the drone terminal to the drone dedicated station and the common base station is implemented, thereby improving communication quality of the drone terminal.

The embodiments shown in FIG. 3-1, FIG. 3-2, and FIG. 4 are based on the embodiment shown in FIG. 2. For the explanation and description of the data transmission method provided in the embodiments of this application, mutual reference may be made between the embodiments provided in this application. For brevity of description, same or similar concepts are not repeated.

Figure 5:
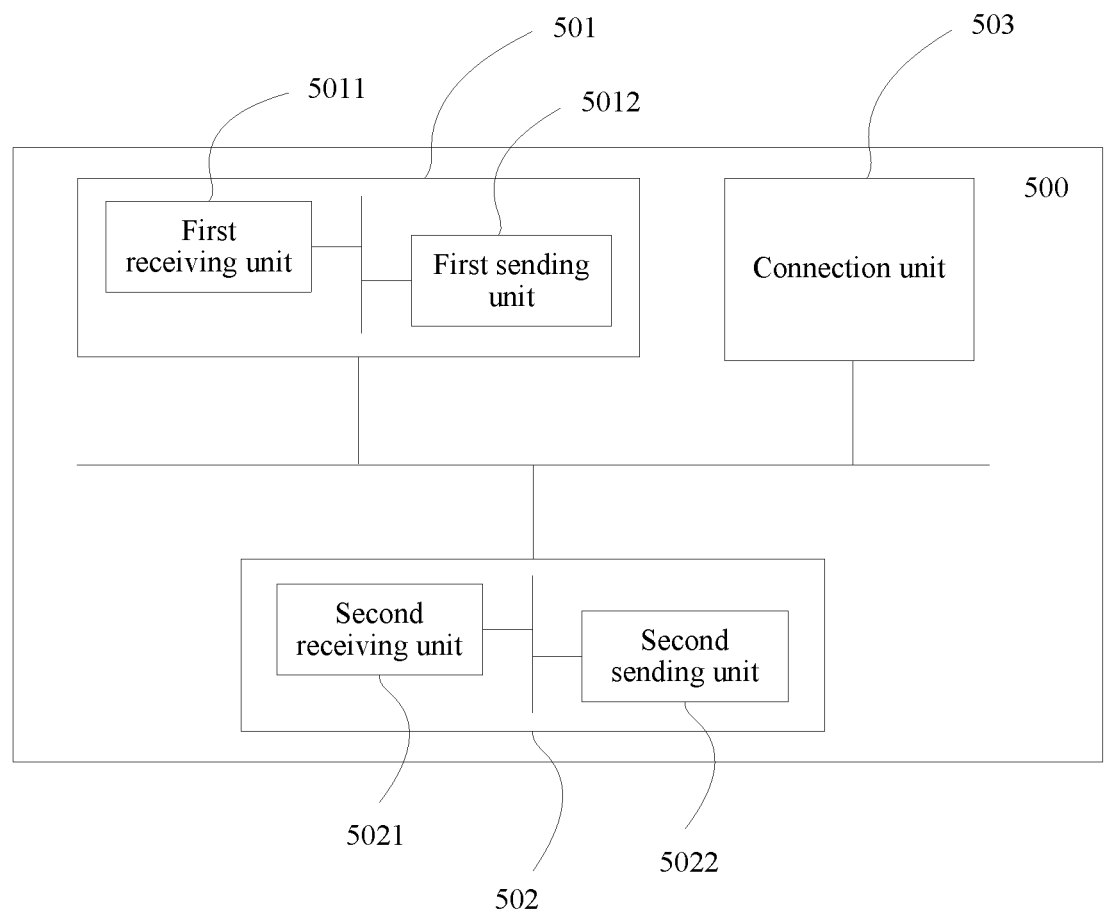
FIG. 5 is a schematic structural diagram of an apparatus 500 according to an embodiment of this application.

FIG. 5 is a schematic structural diagram of an apparatus 500 according to an embodiment of this application.

The apparatus 500 is applied to a terminal device, and the terminal device may be a drone terminal.

As shown in FIG. 5, the apparatus 500 includes a unit or means (means) for performing the steps performed by the first terminal in any method embodiment of the foregoing method, and detailed descriptions of these steps may all be applied to this apparatus embodiment. For example, the apparatus 500 includes a first communications unit 501 and a second communications unit 502. The first communications unit 501 may include a first receiving unit 5011 and a first sending unit 5012 for controlling reception and sending respectively. The first communications unit 501 may receive and send messages through an interface (for example, an air interface) between an access network node (for example, a first access network device or a second access network device) and a terminal. The second communications unit 502 may include a second receiving unit 5021 and a second sending unit 5022 for controlling reception and sending respectively. The second communications unit 502 may receive and send messages through an interface (for example, an air interface) between terminals. The interface herein is a logical concept. In implementation, a corresponding logical unit needs to be disposed, to meet a protocol requirement of a corresponding interface. In a physical connection between nodes, a wireless connection may be used.

In the foregoing method embodiments, a message or information received by the first terminal from the access network node may be controlled and received by using the first receiving unit 5011, and a message or information sent by the first terminal to the access network node may be controlled and sent by using the first sending unit 5012. A message or information received by the first terminal from a second terminal may be controlled and received by using the second receiving unit 5021, and a message or information sent by the first terminal to the second terminal may be controlled and sent by using the second sending unit 5022.

Specifically, the first receiving unit 5011 or the second receiving unit 5021 is a unit for controlling reception, and may receive, by using a receiving apparatus of a terminal such as an antenna or a radio frequency apparatus, information sent by an access network device or another terminal. The first sending unit 5012 or the second sending unit 5022 is a unit for controlling sending, and may send information to an access network device or another terminal by using a sending apparatus of a terminal such as an antenna or a radio frequency apparatus.

For example, the apparatus 500 further includes a connection unit 503, configured to connect to the second terminal based on first instruction information. The first instruction information is used to trigger the first terminal to connect to the second terminal. The first terminal may perform data transmission with the second access network device by using the second terminal. The second access network device is configured to transmit data between the first access network device and the first terminal.

Optionally, the sending unit 5022 is configured to send identification information to the second terminal, so that the second terminal sends the identification information to the second access network device, where the identification information is used by the second access network device to request the first access network device to establish a communication link between the second access network device and the first terminal.

Optionally, the first receiving unit 5011 is further configured to receive first identification information of the first access network device and second identification information of a neighboring access network device of the first access network device from the first access network device; and the second sending unit 5022 is further configured to send the first identification information and the second identification information to the second terminal, so that the second terminal sends second instruction information to the neighboring access network device, where the second instruction information is used to instruct the neighboring access network device to determine whether to request the first access network device to establish a communication link between the second access network device and the first terminal.

Optionally, the first receiving unit 5011 is further configured to receive identification information of a neighboring access network device of the first access network device from the first access network device; the second sending unit 5022 is further configured to send the identification information of the neighboring access network device to the second terminal, so that the second terminal determines the second access network device from the neighboring access network device; the second receiving unit 5021 is further configured to receive identification information of the second access network device from the second terminal; and the first sending unit 5012 is further configured to send the identification information of the second access network device to the first access network device, so that the first access network device requests to add the second access network device to transmit the data between the first access network device and the first terminal.

For detailed descriptions of how the connection unit 503 connects the first terminal to the second terminal and how the first terminal accesses the second access network device by using the second terminal, refer to the foregoing method embodiments. Details are not described herein again. In addition, another sent or received message or other sent or received information is not described in detail herein. For details, refer to related content in the foregoing method embodiments. In addition, for content or a form of the sent or received message or information, refer to the related content in the foregoing method embodiments.

Figure 6:
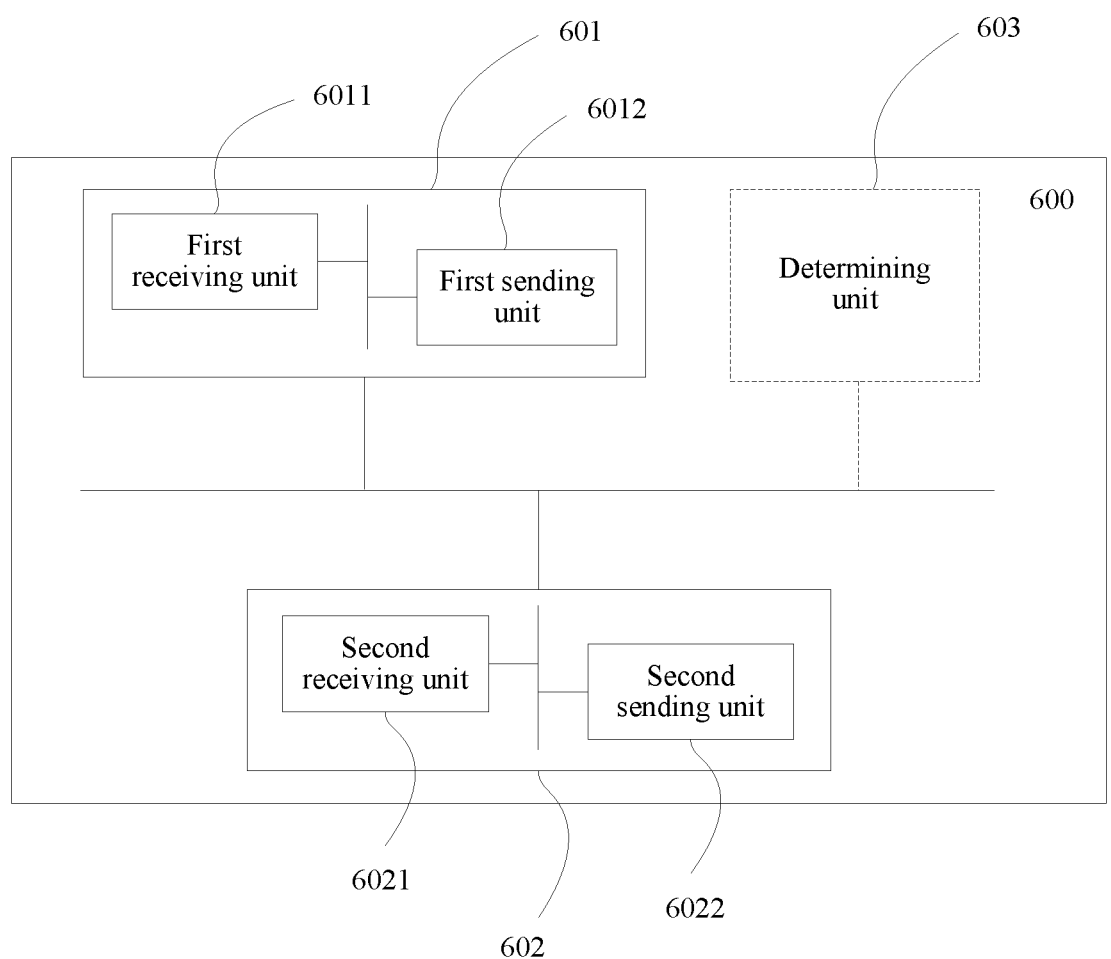
FIG. 6 is a schematic structural diagram of an apparatus 600 according to an embodiment of this application.

FIG. 6 is a schematic structural diagram of an apparatus 600 according to an embodiment of this application.

The apparatus 600 is applied to a first access network device. The first access network device is located in a communications system. The communications system further includes a second access network device. The first access network device serves as a master node, and provides a service for a terminal together with the second access network device serving as a secondary node.

As shown in FIG. 6, the apparatus 600 includes a unit or means (means) for performing the steps performed by the first access network device in any method embodiment of the foregoing method, and detailed descriptions of these steps may all be applied to this apparatus embodiment.

The apparatus 600 includes a first communications unit 601 and a second communications unit 602. The first communications unit 601 is configured to control communication between access network devices (for example, the first access network device and the second access network device), and may include a first receiving unit 6011 and a first sending unit 6012 for controlling reception and sending respectively. The first communications unit 601 may receive and send messages through an interface (for example, an X2 interface, which may also be referred to as an Xn interface) between the access network devices. The second communications unit 602 is configured to control communication between the first access network device and the terminal, and may include a second receiving unit 6021 and a second sending unit 6022 for controlling reception and sending respectively. The second communications unit 602 may receive and send messages through an interface (for example, an air interface) between the first access network device and the terminal. The interface herein is a logical concept. In implementation, a corresponding logical unit needs to be disposed, to meet a protocol requirement of a corresponding interface. In a physical connection between nodes, a wireless connection or a wired connection may be used. For example, the access network device may be wirelessly connected to the terminal, and any two access network devices may be wiredly connected to each other.

In the foregoing method embodiments, a message or information received by the first access network device from another access network device (for example, the second access network device) may be controlled and received by using the first receiving unit 6011; and a message or information sent by the first access network device to another access network device (for example, the second access network device) may be controlled and sent by using the first sending unit 6012. A message or information received by the first access network device from the terminal may be controlled and received by using the second receiving unit 6021, and a message or information sent by the first access network device to the terminal may be controlled and sent by using the second sending unit 6022.

Specifically, the first receiving unit 6011 is a unit for controlling reception, and may receive, by using a connection medium between access network devices such as an optical fiber, information sent by another access network device. The first sending unit 6012 is a unit for controlling sending, and may send information to another access network device by using a connection medium between access network devices such as an optical fiber. The second receiving unit 6021 is a unit for controlling reception, and may receive, by using a receiving apparatus of the first access network device such as an antenna or a radio frequency apparatus, information sent by the terminal. The second sending unit 6022 is a unit for controlling sending, and may send information to the terminal by using a sending apparatus of the first access network device such as an antenna or a radio frequency apparatus.

For example, the second sending unit 6022 is configured to send first instruction information to a first terminal. The first instruction information is used to trigger the first terminal to connect to a second terminal, so that the first terminal performs data transmission with the second access network device by using the second terminal. The second access network device is configured to transmit data between the first access network device and the first terminal.

Optionally, the second sending unit 6022 is further configured to send identification information of the first access network device to the first terminal, so that the second access network device receives the identification information from the first terminal by using the second terminal, where the identification information is used by the second access network device to request the first access network device to establish a communication link between the second access network device and the first terminal.

Optionally, the second sending unit 6022 is further configured to send first identification information of the first access network device and second identification information of a neighboring access network device of the first access network device to the first terminal, so that the neighboring access network device receives second instruction information from the first terminal by using the second terminal, where the second instruction information is used to instruct the neighboring access network device to determine whether to request the first access network device to establish a communication link between the neighboring access network device and the first terminal.

For another example, the apparatus 600 further includes a determining unit 603. In this implementation, the second receiving unit 6021 is configured to receive identification information of at least one access network device from the first terminal, where the at least one access network device includes the second access network device; the determining unit 603 is configured to determine the second access network device from the at least one access network device; and the first sending unit 6012 is configured to send a request message to the second access network device to request to add the second access network device to transmit the data between the first access network device and the first terminal.

For a description of a manner or process of determining the second access network device, refer to related content in the foregoing method embodiments. Details are not described again.

Optionally, the first sending unit 6012 is further configured to: send identification information of a neighboring access network device of the first access network device to the first terminal, so that the second terminal receives the identification information of the neighboring access network device from the first terminal and determines the second access network device from the neighboring access network device; and receive identification information of the second access network device from the second terminal by using the first terminal; and the first sending unit 6012 is further configured to send a request message to the second access network device to request to add the second access network device to transmit the data between the first access network device and the first terminal.

Another sent or received message or other sent or received information is not described in detail herein. For details, refer to related content in the foregoing method embodiments. In addition, for content or a form of the sent or received message or information, refer to the related content in the foregoing method embodiments.

Figure 7:
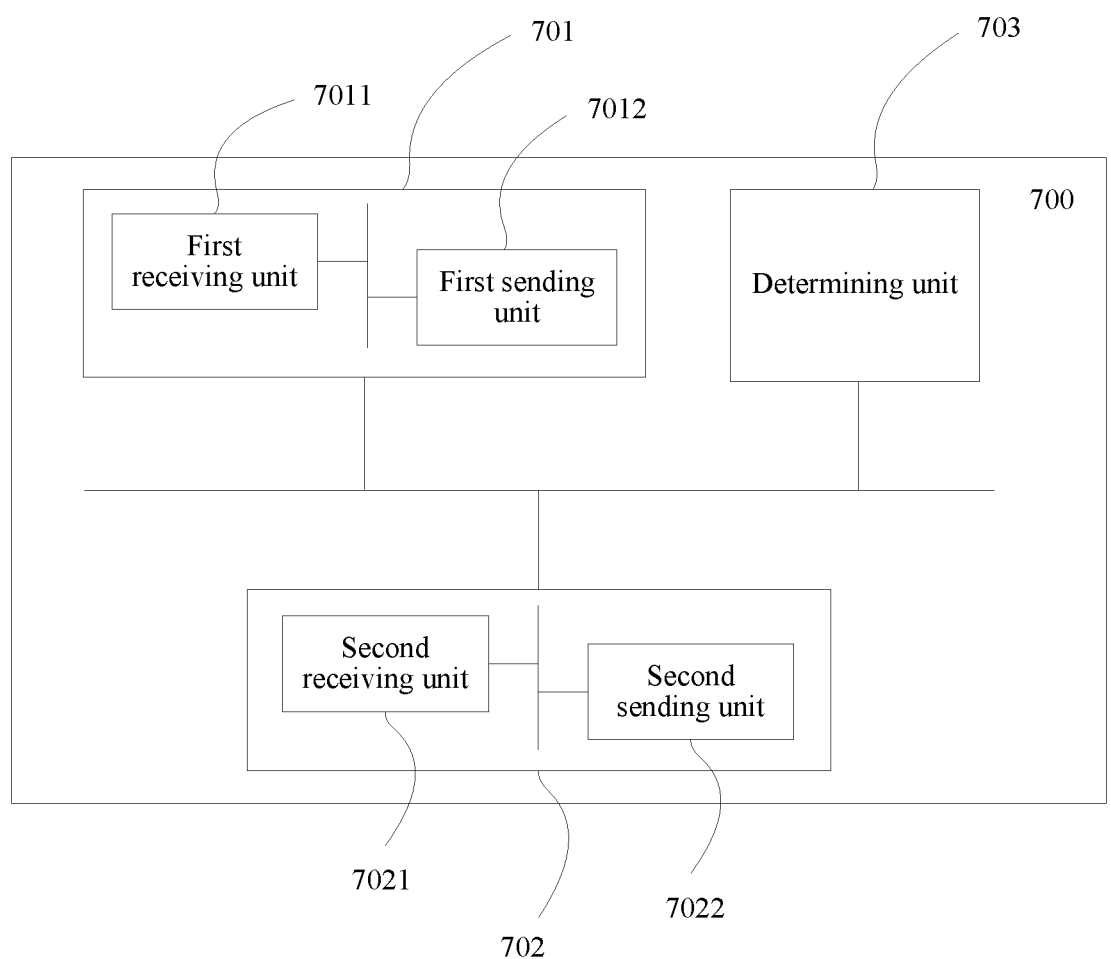
FIG. 7 is a schematic structural diagram of an apparatus 700 according to an embodiment of this application.

FIG. 7 is a schematic structural diagram of an apparatus 700 according to an embodiment of this application.

The apparatus 700 is applied to a terminal device, and the terminal device may be a ground terminal.

As shown in FIG. 7, the apparatus 700 includes a unit or means (means) for performing the steps performed by the second terminal in any method embodiment of the foregoing method, and detailed descriptions of these steps may all be applied to this apparatus embodiment. For example, the apparatus 700 includes a first communications unit 701 and a second communications unit 702. The first communications unit 701 may include a first receiving unit 7011 and a first sending unit 7012 for controlling reception and sending respectively. The first communications unit 701 may receive and send messages through an interface (for example, an air interface) between an access network node (for example, a first access network device or a second access network device) and a terminal. The second communications unit 702 may include a second receiving unit 7021 and a second sending unit 7022 for controlling reception and sending respectively. The second communications unit 702 may receive and send messages through an interface (for example, an air interface) between terminals. The interface herein is a logical concept. In implementation, a corresponding logical unit needs to be disposed, to meet a protocol requirement of a corresponding interface. In a physical connection between nodes, a wireless connection may be used.

In the foregoing method embodiments, a message or information received by the second terminal from the access network node may be controlled and received by using the first receiving unit 7011, and a message or information sent by the second terminal to the access network node may be controlled and sent by using the first sending unit 7012. A message or information received by the second terminal from the first terminal may be controlled and received by using the second receiving unit 7021, and a message or information sent by the second terminal to the first terminal may be controlled and sent by using the second sending unit 7022.

Specifically, the first receiving unit 7011 or the second receiving unit 7021 is a unit for controlling reception, and may receive, by using a receiving apparatus of a terminal such as an antenna or a radio frequency apparatus, information sent by an access network device or another terminal. The first sending unit 7012 or the second sending unit 7022 is a unit for controlling sending, and may send information to an access network device or another terminal by using a sending apparatus of a terminal such as an antenna or a radio frequency apparatus.

The apparatus 700 further includes a determining unit 703, configured to determine a second access network device, where the second access network device is configured to transmit data between the first access network device and the first terminal.

Optionally, the second receiving unit 7021 is configured to receive identification information of the first access network device from the first terminal; and the first sending unit 7012 is configured to send the identification information to the second access network device, where the identification information is used by the second access network device to request the first access network device to establish a communication link between the second access network device and the first terminal.

Optionally, the second receiving unit 7021 is configured to receive first identification information of the first access network device and second identification information of a neighboring access network device of the first access network device from the first terminal; and the first sending unit 7012 is configured to send instruction information to the neighboring access network device, where the instruction information is used to instruct the neighboring access network device to determine whether to request the first access network device to establish a communication link between the neighboring access network device and the first terminal.

Optionally, the second sending unit 7022 is configured to send identification information of at least one access network device to the first terminal, where the at least one access network device includes the second access network device, so that the first access network device receives the identification information of the at least one access network device from the first terminal and requests to add the second access network device to transmit the data between the first access network device and the first terminal.

Optionally, the second receiving unit 7021 is configured to receive identification information of a neighboring access network device of the first access network device from the first terminal; the determining unit 703 is configured to determine the second access network device from the neighboring access network device; and the second sending unit 7022 is configured to send identification information of the second access network device to the first terminal, so that the first access network device receives the identification information of the second access network device from the first terminal and requests to add the second access network device to transmit the data between the first access network device and the first terminal.

Another sent or received message or other sent or received information is not described in detail herein. For details, refer to the foregoing method embodiments. In addition, for content or a form of the sent or received message or information, refer to the foregoing method embodiments.

Figure 8:
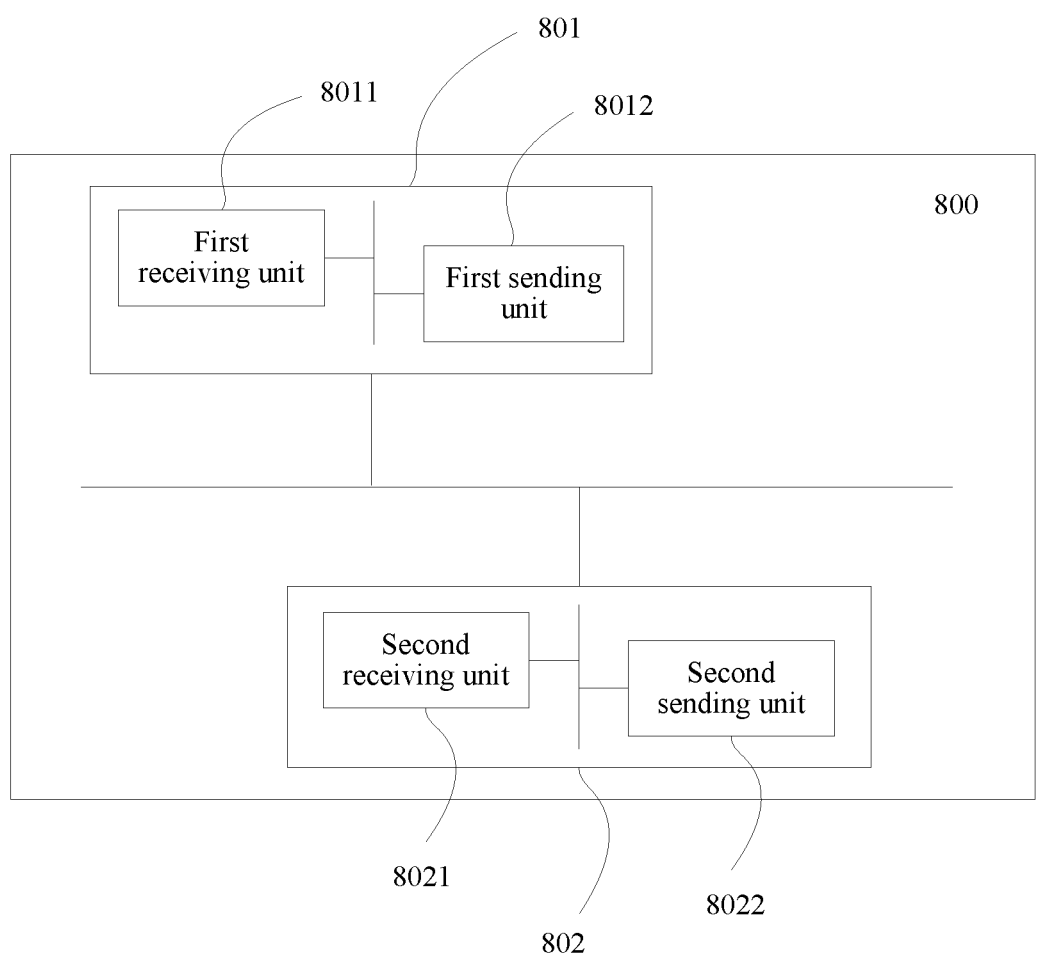
FIG. 8 is a schematic structural diagram of an apparatus 800 according to an embodiment of this application.

FIG. 8 is a schematic structural diagram of an apparatus 800 according to an embodiment of this application.

The apparatus 800 is applied to a second access network device. The second access network device is located in a communications system. The communications system further includes a first access network device. The first access network device serves as a master node, and provides a service for a terminal together with the second access network device serving as a secondary node.

As shown in FIG. 8, the apparatus 800 includes a unit or means (means) for performing the steps performed by the second access network device in any method embodiment of the foregoing method, and detailed descriptions of these steps may all be applied to this apparatus embodiment.

The apparatus 800 includes a first communications unit 801 and a second communications unit 802. The first communications unit 801 is configured to control communication between access network devices (for example, the first access network device and the second access network device), and may include a first receiving unit 8011 and a first sending unit 8012 for controlling reception and sending respectively. The first communications unit 801 may receive and send messages through an interface (for example, an X2 interface, which may also be referred to as an Xn interface) between the access network devices. The second communications unit 802 is configured to control communication between the second access network device and the terminal, and may include a second receiving unit 8021 and a second sending unit 8022 for controlling reception and sending respectively. The second communications unit 802 may receive and send messages through an interface (for example, an air interface) between the second access network device and the terminal. The interface herein is a logical concept. In implementation, a corresponding logical unit needs to be disposed, to meet a protocol requirement of a corresponding interface. In a physical connection between nodes, a wireless connection or a wired connection may be used. For example, the access network device may be wirelessly connected to the terminal, and any two access network devices may be wiredly connected to each other.

In the foregoing method embodiments, a message or information received by the second access network device from another access network device (for example, the first access network device) may be controlled and received by using the first receiving unit 8011; and a message or information sent by the second access network device to another access network device (for example, the first access network device) may be controlled and sent by using the first sending unit 8012. A message or information received by the second access network device from the terminal may be controlled and received by using the second receiving unit 8021, and a message or information sent by the second access network device to the terminal may be controlled and sent by using the second sending unit 8022.

Specifically, the first receiving unit 8011 is a unit for controlling reception, and may receive, by using a connection medium between access network devices such as an optical fiber, information sent by another access network device. The first sending unit 8012 is a unit for controlling sending, and may send information to another access network device by using a connection medium between access network devices such as an optical fiber. The second receiving unit 8021 is a unit for controlling reception, and may receive, by using a receiving apparatus of the second access network device such as an antenna or a radio frequency apparatus, information sent by the terminal. The second receiving unit 8022 is a unit for controlling sending, and may send information to the terminal by using a sending apparatus of the second access network device such as an antenna or a radio frequency apparatus.

For example, the second receiving unit 8021 is configured to receive identification information of the first access network device from the first terminal by using a second terminal, where a first terminal accesses the first access network device, and the first terminal connects to the second terminal.

The first sending unit 8012 is configured to send a request message to the first access network device, to request to establish a communication link between the second access network device and the first terminal, where the communication link is used to transmit data between the first access network device and the first terminal.

Another sent or received message or other sent or received information is not described in detail herein. For details, refer to the foregoing method embodiments. In addition, for content or a form of the sent or received message or information, refer to the foregoing method embodiments.

It should be understood that division of the units of any one of the apparatus 500, the apparatus 600, the apparatus 700, and the apparatus 800 is merely logical function division, and during actual implementation, the units may be all or partially integrated into one physical entity, or may be physically separated. In addition, these units may all be implemented in a form of software invoked by using a processing element; or may all be implemented in a form of hardware; or some units may be implemented in a form of software invoked by using a processing element, and some units are implemented in a form of hardware. For example, the first communications unit 501, the second communications unit 502, or the connection unit 503 in the apparatus 500 may be an independently disposed processing element, or may be integrated into a chip of the terminal for implementation. In addition, the first communications unit 501, the second communications unit 502, or the connection unit 503 in the apparatus 500 may alternatively be stored in a form of a program into a memory of the terminal, and a processing element of the terminal invokes and performs a function of the unit. For another example, the first communications unit 601, the second communications unit 602, or the determining unit 603 in the apparatus 600 may be an independently disposed processing element, or may be integrated into a chip of the access network device for implementation. In addition, the first communications unit 601, the second communications unit 602, or the determining unit 603 in the apparatus 600 may alternatively be stored in a form of a program into a memory of the access network device, and a processing element of the access network device invokes and performs a function of the unit. Implementations of the other units are similar thereto. In addition, these units may be all or partially integrated, or may be implemented independently. The processing element herein may be an integrated circuit and has a signal processing capability. In an implementation process, the steps in the foregoing methods or the foregoing units may be implemented by using a hardware integrated logic circuit in the processing element, or by using instructions in a form of software.

For example, the units in the apparatus 500, the apparatus 600, the apparatus 700, and the apparatus 800 may be configured as one or more integrated circuits for implementing the foregoing method, for example, one or more application-specific integrated circuits (ASIC), or one or more microprocessors (digital signal processor, DSP), or one or more field programmable gate arrays (FPGA). For another example, when a unit above is implemented in a form of invoking a program by using a processing element, the processing element may be a general-purpose processor, for example, a central processing unit (CPU) or another processor that can invoke a program. For another example, these units may be integrated together, and implemented in a form of a system-on-a-chip (, SOC).

Figure 9:
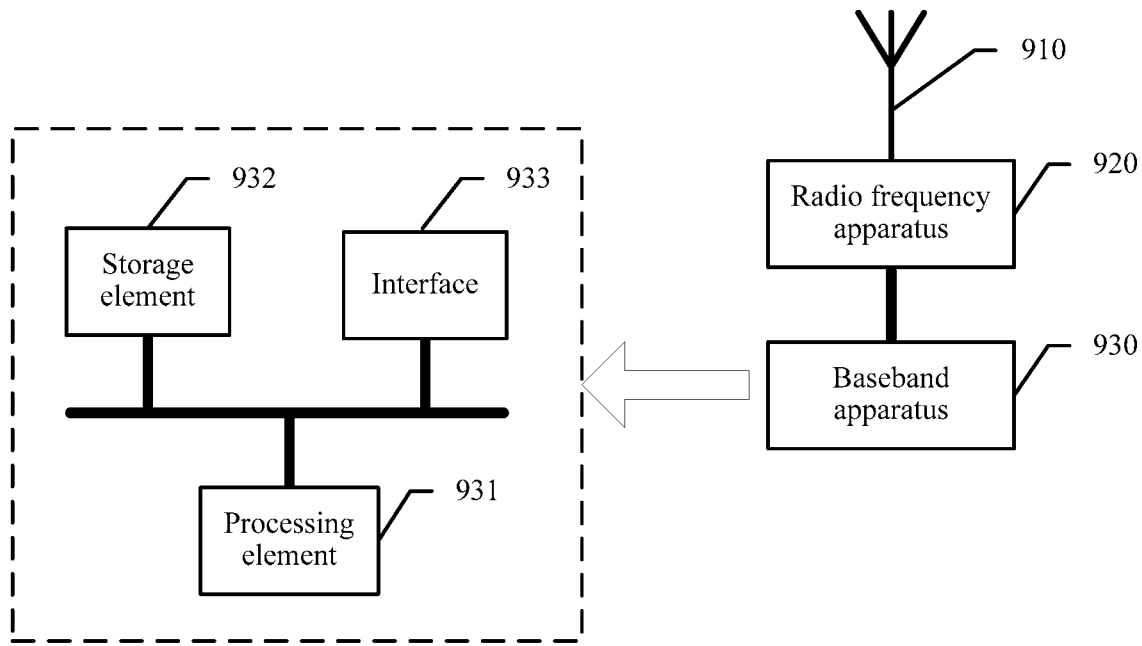
FIG. 9 is a schematic structural diagram of an access network device 900 according to an embodiment of this application.

FIG. 9 is a schematic structural diagram of an access network device 900 according to an embodiment of this application.

The access network device 900 may be the first access network device or the second access network device in the foregoing embodiments, and is configured to implement an operation of the first access network device or the second access network device in the foregoing embodiments. As shown in FIG. 9, the access network device includes an antenna 910, a radio frequency apparatus 920, and a baseband apparatus 930. The antenna 910 is connected to the radio frequency apparatus 920. In an uplink direction, the radio frequency apparatus 920 receives, by using the antenna 910, information sent by the terminal, and sends, to the baseband apparatus 930, the information sent by the terminal for processing. In a downlink direction, the baseband apparatus 930 processes information of the terminal, and sends the information of the terminal to the radio frequency apparatus 920. The radio frequency apparatus 920 processes the information of the terminal, and then sends the processed information of the terminal to the terminal by using the antenna 910. Access network devices, for example, the first access network device and the second access network device, may communicate with each other by using a transmission medium. The transmission medium may be a wired medium, for example, an optical fiber; or may be a wireless medium.

The foregoing apparatus applied to the first access network device or the second access network device may be located in the baseband apparatus 930. In an implementation, the units shown in FIG. 6 or FIG. 8 are implemented by invoking a program by the processing element. For example, the baseband apparatus 930 includes a processing element 931 and a storage element 932. The processing element 931 invokes a program stored in the storage element 932, to perform the method performed by the first access network device or the second access network device in the foregoing method embodiments. In addition, the baseband apparatus 90 may further include an interface 933, configured to exchange information with the radio frequency apparatus 920. The interface is, for example, a common public radio interface (CPRI).

In another implementation, the units shown in FIG. 6 or FIG. 8 may be configured as one or more processing elements for implementing the method performed by the first access network device or the second access network device. These processing elements are disposed on the baseband apparatus 930. The processing elements herein may be integrated circuits, for example, one or more ASICs, or one or more DSPs, or one or more FPGAs. These integrated circuits may be integrated together to form a chip.

For example, the units shown in FIG. 6 or FIG. 8 may be integrated together, and implemented in a form of a SOC. For example, the baseband apparatus 930 includes a SOC chip, configured to implement the foregoing method. The processing element 931 and the storage element 932 may be integrated into the chip, and the processing element 931 invokes the program stored in the storage element 932 to implement the method performed by the first access network device or the second access network device or a function of each unit shown in FIG. 6 or FIG. 8. Alternatively, at least one integrated circuit may be integrated into the chip, and configured to implement the method performed by the first access network device or the second access network device or a function of each unit shown in FIG. 6 or FIG. 8. Alternatively, in combination with the foregoing implementations, functions of some units are implemented in a form of invoking the program by the processing element, and functions of some units are implemented in a form of integrated circuits.

Regardless of a used manner, the foregoing configuration apparatus applied to the first access network device or the second access network device includes at least one processing element and a storage element. The at least one processing element is configured to perform the method performed by the first access network device or the second access network device provided in the foregoing method embodiments. In a first manner, to be specific, a manner of executing the program stored in the storage element, the processing element may perform some or all steps performed by the SN or the MN in the foregoing method embodiments; or in a second manner, to be specific, a manner of using a hardware integrated logic circuit in the processing element in combination with an instruction, the processing element may perform some or all steps performed by the first access network device or the second access network device in the foregoing method embodiments; or certainly, in combination with the first manner and the second manner, the processing element may perform the method performed by the first access network device or the second access network device in the foregoing method embodiments.

As described above, the processing element herein may be a general-purpose processor, for example, a CPU, or may be configured as one or more integrated circuits for implementing the foregoing methods, for example, one or more ASICs, or one or more DSPs, or one or more FPGAs.

The storage element may be one memory, or may be a general term of a plurality of storage elements.

Figure 10:
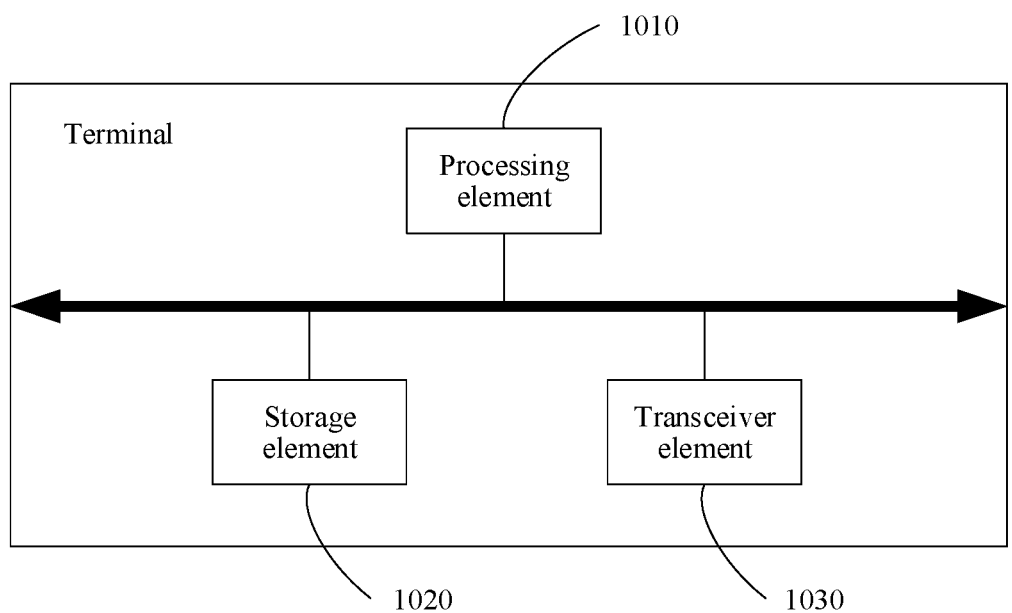
FIG. 10 is a schematic structural diagram of a terminal 1000 according to an embodiment of this application.

FIG. 10 is a schematic structural diagram of a terminal 1000 according to an embodiment of this application. The terminal 1000 may be the first terminal or the second terminal in the foregoing embodiments, and is configured to implement an operation of the first terminal or the second terminal in the foregoing embodiments. As shown in FIG. 10, the terminal 1000 includes a processing element 1010, a storage element 1020, and a transceiver element 1030. The transceiver element 1030 may be connected to an antenna. In a downlink direction, the transceiver element 1030 receives, by using the antenna, information sent by an access network device such as a base station, and sends the information to the processing element 1010 for processing. In an uplink direction, the processing element 1010 processes data of the terminal, and sends the processed data to the access network device by using the transceiver element 1030.

The storage element 1020 is configured to store a program for implementing the foregoing method embodiments. The processing element 1010 invokes the program, to perform the operations in the foregoing method embodiments.

In another implementation, the units in FIG. 7 or FIG. 9 may be configured as one or more processing elements for implementing the foregoing method performed by the terminal. These processing elements are disposed on a circuit board of the terminal. The processing elements herein may be integrated circuits, for example, one or more ASICs, or one or more DSPs, or one or more FPGAs. These integrated circuits may be integrated together to form a chip.

For example, the units in FIG. 7 or FIG. 9 may be integrated together, and implemented in a form of a SOC. For example, the terminal includes aSOC chip, configured to implement the foregoing method. The processing element 1010 and the storage element 1020 may be integrated into the chip, and the processing element 1010 invokes the program stored in the storage element 1020 to implement the foregoing method or a function of each unit in FIG. 7 or FIG. 9. Alternatively, at least one integrated circuit may be integrated into the chip, and configured to implement the foregoing method or a function of each unit in FIG. 7 or FIG. 9. Alternatively, in combination with the foregoing implementations, functions of some units are implemented in a form of invoking the program by the processing element, and functions of some units are implemented in a form of integrated circuits.

Regardless of a used manner, the foregoing configuration apparatus includes at least one processing element and a storage element, where the at least one processing element is configured to perform the method provided in the foregoing method embodiments. In a first manner, to be specific, a manner of executing the program stored in the storage element, the processing element may perform some or all steps in the foregoing method embodiments; or in a second manner, to be specific, a manner of using a hardware integrated logic circuit in the processing element in combination with an instruction, the processing element may perform some or all steps in the foregoing method embodiments; or certainly, in combination with the first manner and the second manner, the processing element may perform the method provided in the foregoing method embodiments.

As described above, the processing element herein may be a general-purpose processing element, for example, a CPU, or may be configured as one or more integrated circuits for implementing the foregoing methods, for example, one or more ASICs, or one or more DSPs, or one or more FPGAs.

The storage element may be one memory, or may be a general term of a plurality of storage elements.

Figure 11:
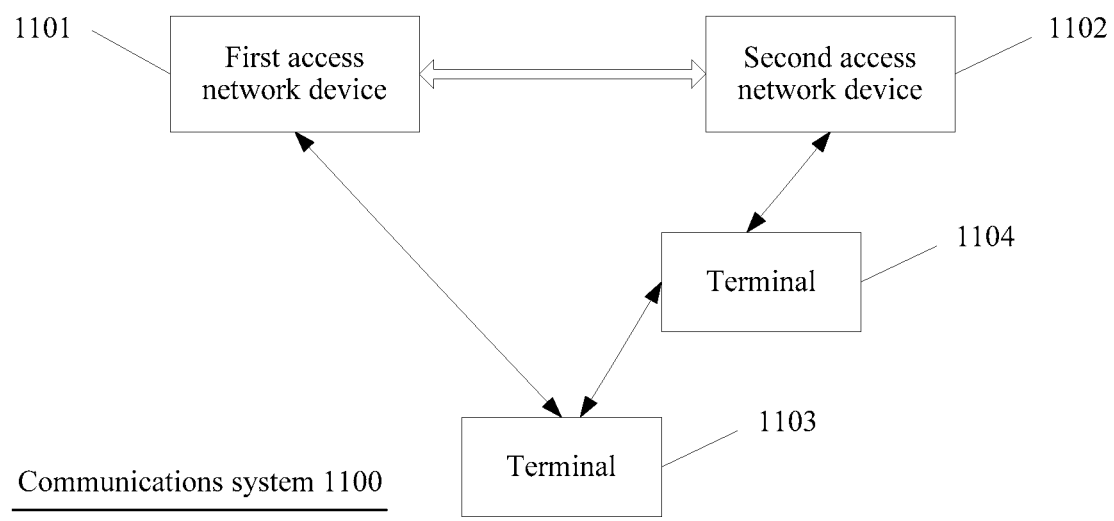
FIG. 11 is a schematic diagram of a communications system 1100 according to an embodiment of this application.

FIG. 11 is a schematic diagram of a communications system 1100 according to an embodiment of this application.

The communications system 1100 includes:

a first access network device 1101, where the first access network device 1101 may perform an operation performed by the first access network device in the embodiment of any one of FIG. 2 to FIG. 4, and for example, the first access network device 1101 may be the access network device in the embodiment shown in FIG. 6 or FIG. 9; and a second access network device 1102, where the second access network device 1102 may perform an operation performed by the second access network device in the embodiment of any one of FIG. 2 to FIG. 4, and for example, the second access network device 1102 may be the access network device shown in the embodiment of FIG. 8 or FIG. 9.

The communications system may further include a terminal 1103 and a terminal 1104. The terminal 1103 may perform an operation performed by the first terminal in the embodiment of any one of FIG. 2 to FIG. 4, and may be the terminal in the embodiment of FIG. 5 or FIG. 10. The terminal 1104 may perform an operation performed by the second terminal in the embodiment of any one of FIG. 2 to FIG. 4, and may be the terminal in the embodiment of FIG. 7 or FIG. 10. Details are not described herein again.

The communications system may also be the communications system shown in FIG. 1.

A person skilled in the art may be clearly aware that, the descriptions of the embodiments provided in this application may be referred to each other. For convenience and conciseness, for example, for functions of the apparatuses and devices provided in the embodiments of this application and the performed steps, refer to related descriptions of the method embodiments of this application. The method embodiments and the apparatus embodiments may also be referred to each other.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid-state drive or Solid State Disk (SSD)), or the like.

What is claimed is:

1. A data transmission method, comprising:
    receiving, by a first terminal, first instruction information from a first access network device, wherein the first terminal accesses the first access network device, and the first instruction information is used to trigger the first terminal to connect to a second terminal;
    connecting, by the first terminal, to the second terminal based on the first instruction information;
    performing, by the first terminal, data transmission with a second access network device using the second terminal, wherein the second access network device is configured to transmit data between the first access network device and the first terminal,
    receiving, by the first terminal, identification information of the first access network device from the first access network device; and
    sending, by the first terminal, the identification information to the second terminal, to cause the second terminal to send the identification information to the second access network device, wherein the identification information is used by the second access network device to request the first access network device to establish a communication link between the second access network device and the first terminal.

2. The method according to claim 1, further comprising:
    receiving, by the first terminal, first identification information of the first access network device and second identification information of a neighboring access network device of the first access network device from the first access network device; and
    sending, by the first terminal, the first identification information and the second identification information to the second terminal, to cause the second terminal to send second instruction information to the neighboring access network device, wherein the second instruction information is used to instruct the neighboring access network device to determine whether to request the first access network device to establish a communication link between the neighboring access network device and the first terminal.

3. The method according to claim 1, wherein the method further comprises:
receiving, by the first terminal, identification information of at least one access network device from the second terminal, wherein the at least one access network device comprises the second access network device; and
sending, by the first terminal, the identification information of the at least one access network device to the first access network device, to cause the first access network device to request to add the second access network device to transmit the data between the first access network device and the first terminal.

4. The method according to claim 1, further comprising:
receiving, by the first terminal, identification information of a neighboring access network device of the first access network device from the first access network device;
sending, by the first terminal, the identification information of the neighboring access network device to the second terminal, to enable the second terminal to determines the second access network device from the neighboring access network device;
receiving, by the first terminal, identification information of the second access network device from the second terminal; and
sending, by the first terminal, the identification information of the second access network device to the first access network device, to cause the first access network device to request to add the second access network device to transmit the data between the first access network device and the first terminal.

5. The method according to claim 1, wherein the first terminal is a drone terminal, and the second terminal is a ground terminal.

6. A non-transitory processor-readable medium having processor-executable instructions stored thereon for a first terminal, the processor-executable instructions, when executed by a processor, causes performance of the following:
receiving first instruction information from the first access network device, wherein the first instruction information is used to trigger the first terminal to connect to a second terminal;
connecting the first terminal to the second terminal based on the first instruction information, to cause the first terminal to perform data transmission with a second access network device using the second terminal, wherein the second access network device is configured to transmit data between the first access network device and the first terminal,
receiving identification information of the first access network device from the first access network device; and
sending the identification information to the second terminal, to cause the second terminal to send the identification information to the second access network device, wherein the identification information is used by the second access network device to request the first access network device to establish a communication link between the second access network device and the first terminal.

7. The non-transitory processor-readable medium according to claim 6, wherein the medium further stores instructions executed by the processor, to perform:
receiving first identification information of the first access network device and second identification information of a neighboring access network device of the first access network device from the first access network device; and
sending the first identification information and the second identification information to the second terminal, to cause the second terminal to send second instruction information to the neighboring access network device, wherein the second instruction information is used to instruct the neighboring access network device to determine whether to request the first access network device to establish a communication link between the neighboring access network device and the first terminal.

8. The non-transitory processor-readable medium according to claim 6, wherein the medium further stores instructions executed by the processor, to perform:
receiving identification information of at least one access network device from the second terminal, wherein the at least one access network device comprises the second access network device; and
sending the identification information of the at least one access network device to the first access network device, to cause the first access network device to request to add the second access network device to transmit the data between the first access network device and the first terminal.

9. The non-transitory processor-readable medium according to claim 6, wherein the medium further stores instructions executed by the processor, to perform:
receiving identification information of a neighboring access network device of the first access network device from the first access network device;
sending the identification information of the neighboring access network device to the second terminal, to cause the second terminal to determine the second access network device from the neighboring access network device;
receiving identification information of the second access network device from the second terminal; and
sending the identification information of the second access network device to the first access network device, to enable the first access network device to request to add the second access network device to transmit the data between the first access network device and the first terminal.

10. The non-transitory processor-readable medium according to claim 6, wherein the first terminal is a drone terminal, and the second terminal is a ground terminal.

11. A first terminal, wherein the first terminal accesses a first access network device, the first terminal comprising:
a first receiver, configured to receive first instruction information from the first access network device, wherein the first instruction information is used to trigger the first terminal to connect to a second terminal;
a processor, configured to connect the first terminal to the second terminal based on the first instruction information, to cause the first terminal to perform data transmission with a second access network device using the second terminal, wherein the second access network device is configured to transmit data between the first access network device and the first terminal, the first receiver is further configured to receive identification information of the first access network device from the first access network device; and the transmitter is configured to send the identification information to the second terminal, to cause the second terminal to send the identification information to the second access network device, wherein the identification information is used by the second access network device to request the first access network device to establish a communication link between the second access network device and the first terminal.

12. The first terminal according to claim 11, further comprising a transmitter, wherein the first receiver is further configured to receive first identification information of the first access network device and second identification information of a neighboring access network device of the first access network device from the first access network device; and the transmitter is configured to send the first identification information and the second identification information to the second terminal, to cause the second terminal to send second instruction information to the neighboring access network device, wherein the second instruction information is used to instruct the neighboring access network device to determine whether to request the first access network device to establish a communication link between the neighboring access network device and the first terminal.

13. The first terminal according to claim 11, further comprising a second receiver and a transmitter, wherein the second receiver is further configured to receive identification information of at least one access network device from the second terminal, wherein the at least one access network device comprises the second access network device; and the transmitter is configured to send the identification information of the at least one access network device to the first access network device, to cause the first access network device to request to add the second access network device to transmit the data between the first access network device and the first terminal.

14. The first terminal according to claim 11, further comprising a second receiver, a first transmitter, and a second transmitter, wherein the first receiver is further configured to receive identification information of a neighboring access network device of the first access network device from the first access network device;

the first transmitter is configured to send the identification information of the neighboring access network device to the second terminal, to cause the second terminal to determine the second access network device from the neighboring access network device;

the second receiver is configured to receive identification information of the second access network device from the second terminal; and the second transmitter is further configured to send the identification information of the second access network device to the first access network device, to cause the first access network device to request to add the second access network device to transmit the data between the first access network device and the first terminal.

15. The first terminal according to claim 11, wherein the first terminal is a drone terminal.

* * * * *

UNITED STATES PATENT AND TRADEMARK OFFICE
CERTIFICATE OF CORRECTION

PATENT NO. : 11,229,077 B2
APPLICATION NO. : 16/686801
DATED : January 18, 2022
INVENTOR(S) : Shi et al.

It is certified that error appears in the above-identified patent and that said Letters Patent is hereby corrected as shown below:

In the Claims

Claim 4: Column 33, Line 26: "determines the second access network device from the" should read -- determine the second access network device from the --.

Signed and Sealed this
Twenty-fourth Day of May, 2022

Katherine Kelly Vidal
*Director of the United States Patent and Trademark Office*